(12) United States Patent
Tsuda et al.

(10) Patent No.: US 12,409,614 B2
(45) Date of Patent: Sep. 9, 2025

(54) FIBER-REINFORCED PLASTIC AND PRODUCTION METHOD FOR FIBER-REINFORCED PLASTIC

(71) Applicant: Toray Industries, Inc., Tokyo (JP)

(72) Inventors: Terumasa Tsuda, Ehime (JP);
Tomohiro Takehara, Ehime (JP);
Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 189 days.

(21) Appl. No.: 18/017,968

(22) PCT Filed: Jul. 21, 2021

(86) PCT No.: PCT/JP2021/027404
§ 371 (c)(1),
(2) Date: Jan. 25, 2023

(87) PCT Pub. No.: WO2022/024939
PCT Pub. Date: Feb. 3, 2022

(65) Prior Publication Data
US 2023/0294370 A1    Sep. 21, 2023

(30) Foreign Application Priority Data
Jul. 27, 2020    (JP) .................. 2020-126652

(51) Int. Cl.
*B29C 70/10*    (2006.01)
*B29C 70/42*    (2006.01)
(Continued)

(52) U.S. Cl.
CPC .............. *B29C 70/10* (2013.01); *B29C 70/42* (2013.01); *B29C 70/545* (2013.01); *C08J 5/243* (2021.05);
(Continued)

(58) Field of Classification Search
CPC ........ B29C 2793/0036; B29C 70/0035; B29C 70/10; B29C 70/12; B29C 70/14;
(Continued)

(56) References Cited

U.S. PATENT DOCUMENTS

| | | | |
|---|---|---|---|
| 3,801,693 | A | 4/1974 | Stallings et al. |
| 2006/0110599 | A1 | 5/2006 | Honma et al. |

(Continued)

FOREIGN PATENT DOCUMENTS

| | | |
|---|---|---|
| CN | 1732083 A | 2/2006 |
| CN | 109348708 A | 2/2019 |

(Continued)

OTHER PUBLICATIONS

The extended European Search Report issued Jul. 22, 2024, by the European Patent Office in corresponding European Patent Application No. 21850726.7-1014. (8 pages).

(Continued)

*Primary Examiner* — Lawrence D Ferguson
(74) *Attorney, Agent, or Firm* — Buchanan Ingersoll & Rooney PC

(57) ABSTRACT

The present invention pertains to a fiber-reinforced plastic that has, as at least one of the surface layers in the thickness direction thereof, a layer containing reinforced fibers and a matrix in which a thermosetting resin and a thermoplastic resin are integrated. The reinforced fibers form discontinuous reinforced fiber bundles randomly stacked or discontinuous reinforced fiber bundles arranged in one direction. A portion of the discontinuous reinforced fiber bundles is in contact with both of the thermosetting resin and the thermoplastic resin. The thermoplastic resin is exposed in at least a portion of the surface of the surface layer.

14 Claims, 5 Drawing Sheets

(51) Int. Cl.
*B29C 70/54* (2006.01)
*C08J 5/24* (2006.01)
*B29K 63/00* (2006.01)
*B29K 307/04* (2006.01)
*B29K 309/08* (2006.01)

(52) U.S. Cl.
CPC ...... *B29K 2063/00* (2013.01); *B29K 2307/04* (2013.01); *B29K 2309/08* (2013.01); *C08J 2363/00* (2013.01)

(58) Field of Classification Search
CPC ... B29C 70/42; B29C 70/545; B29K 2063/00; B29K 2307/04; B29K 2309/08; C08J 2300/22; C08J 2300/24; C08J 2363/00; C08J 2363/02; C08J 2367/04; C08J 2377/02; C08J 5/042; C08J 5/043; C08J 5/243; C08J 5/244; C08J 5/04
See application file for complete search history.

(56) References Cited

U.S. PATENT DOCUMENTS

| | | |
|---|---|---|
| 2010/0092770 A1 | 4/2010 | Wadahara et al. |
| 2012/0094106 A1 | 4/2012 | Honma et al. |
| 2013/0122241 A1 | 5/2013 | Wadahara et al. |
| 2018/0222128 A1 | 8/2018 | Tomioka et al. |
| 2019/0225764 A1 | 7/2019 | Harada et al. |
| 2022/0251317 A1 | 8/2022 | Misumi et al. |
| 2022/0324184 A1 | 10/2022 | Misumi et al. |
| 2022/0347965 A1 | 11/2022 | Harada et al. |

FOREIGN PATENT DOCUMENTS

| | | | |
|---|---|---|---|
| EP | 1593491 | A1 | 11/2005 |
| JP | 4834290 | A | 5/1975 |
| JP | 6194726 | A | 5/1986 |
| JP | 2018-062119 | A | 4/2018 |
| TW | 200421968 | A | 10/2004 |
| TW | 200829408 | A | 7/2008 |
| WO | 2004060658 | A1 | 7/2004 |
| WO | 2008038591 | A1 | 4/2008 |
| WO | 2018066600 | A1 | 4/2018 |
| WO | 2020235485 | A1 | 11/2020 |

OTHER PUBLICATIONS

International Search Report and Written Opinion for International Application No. PCT/JP2021/027404, dated Oct. 19, 2021, 6 pages.
Office Action (Notification for the Opinion of Examination) issued Nov. 7, 2024, by the Taiwanese Intellectual Property Office Ministry of Economic Affairs in corresponding Taiwanese Patent Application No. 110127474 and an English translation of the Office Action. (24 pages).
Office Action (Notification of the First Office Action) issued Jun. 20, 2025, by the National Intellectual Property Administration, P. R. China in corresponding Chinese Patent Application No. 202180059742.X and an English translation of the Office Action. (18 pages).

[FIG. 1]
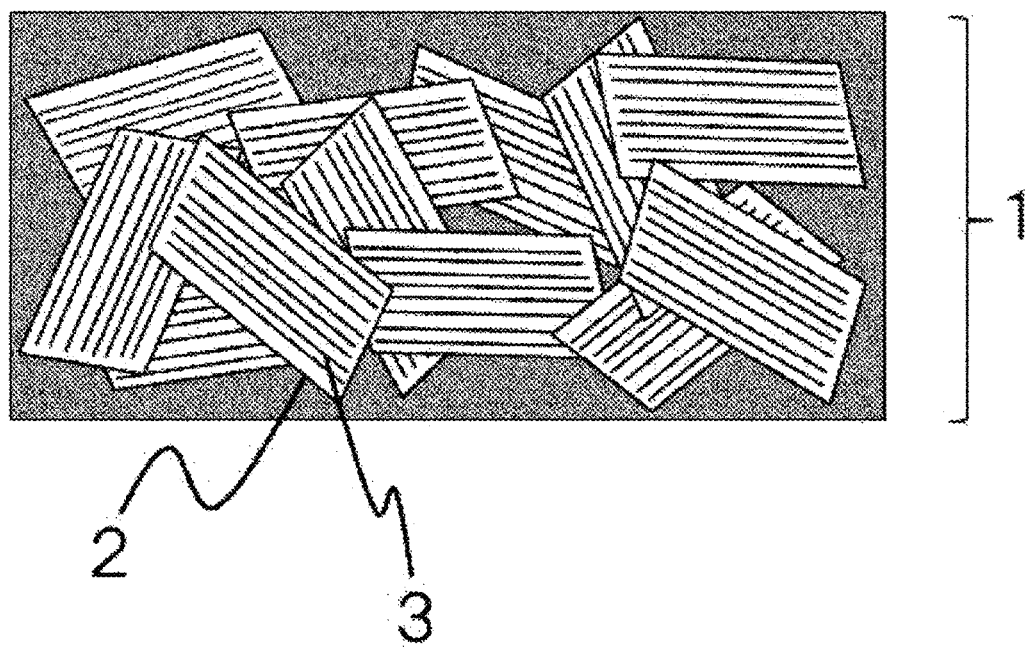
[FIG. 2]
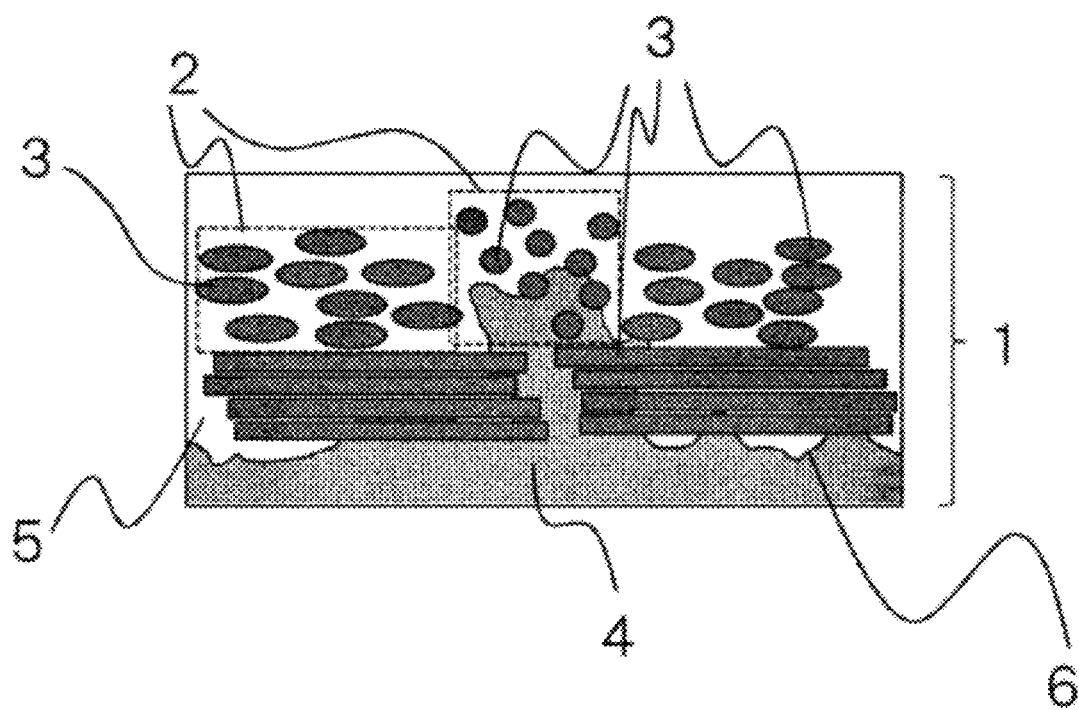

[FIG. 3]
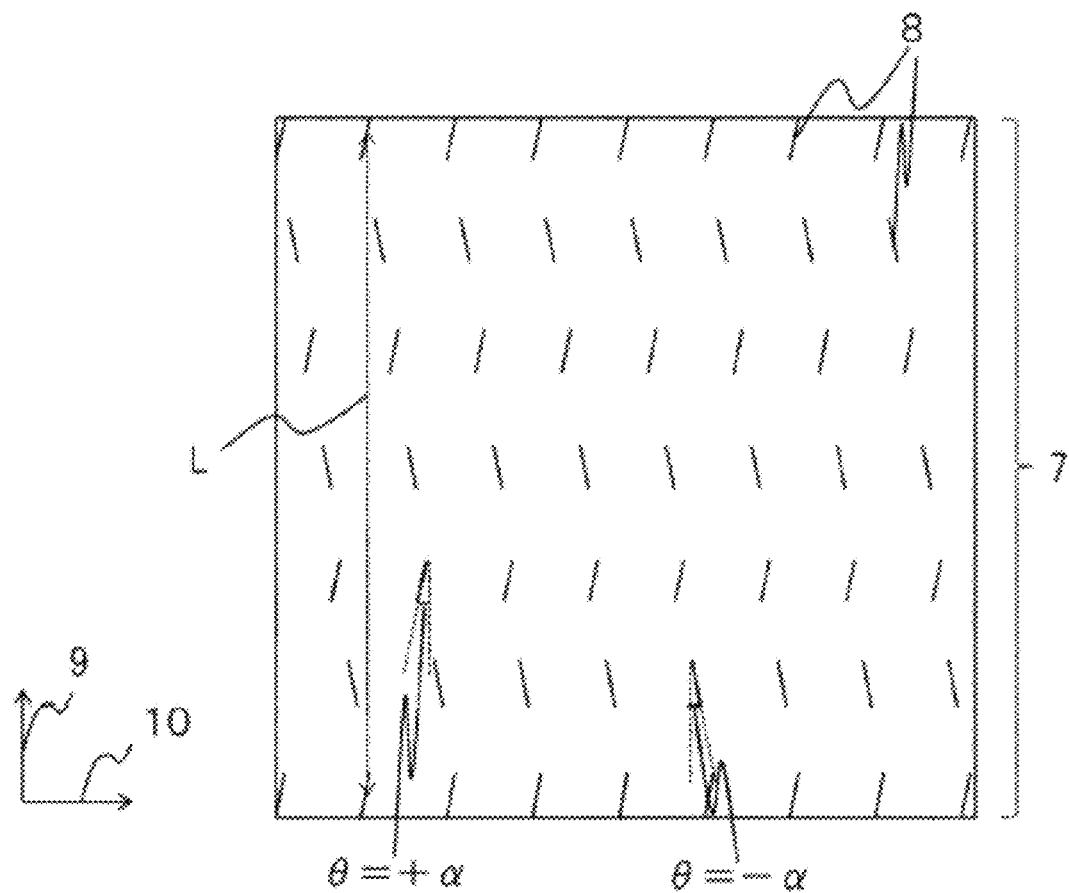
[FIG. 4]
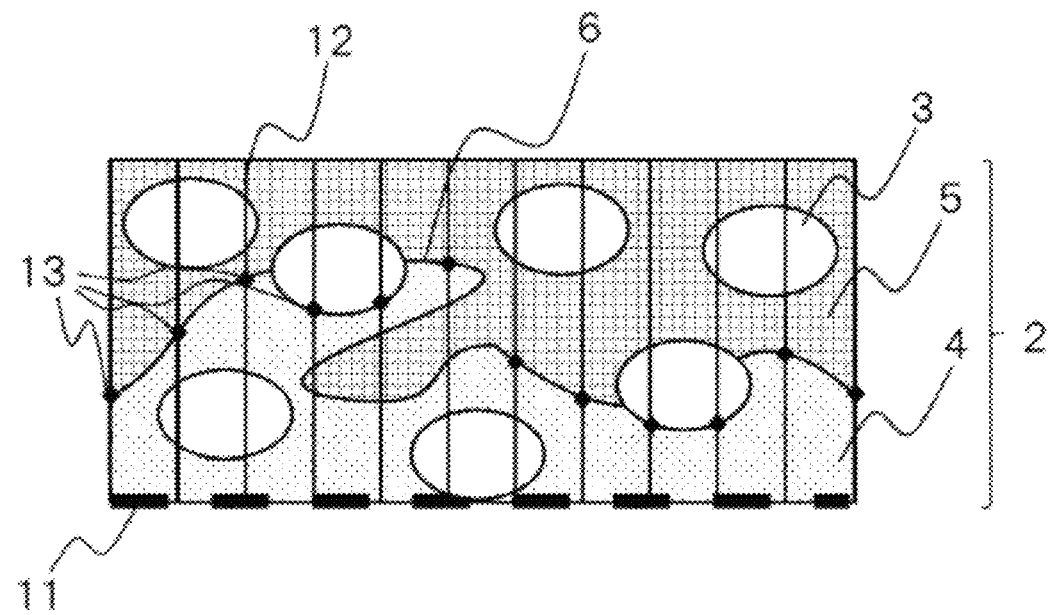

[FIG. 5]
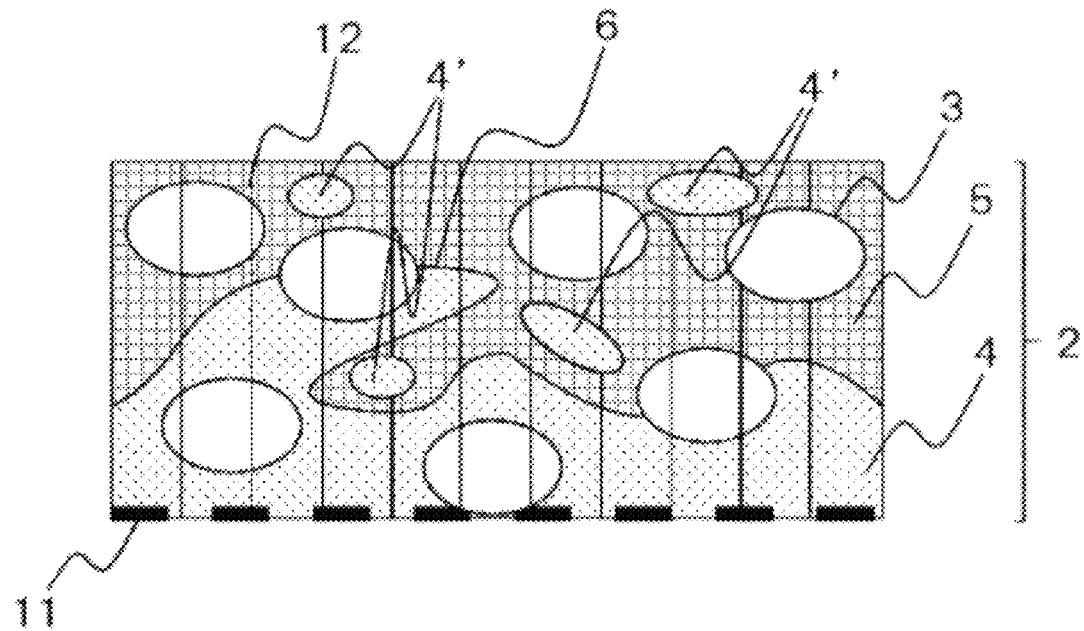
[FIG. 6]
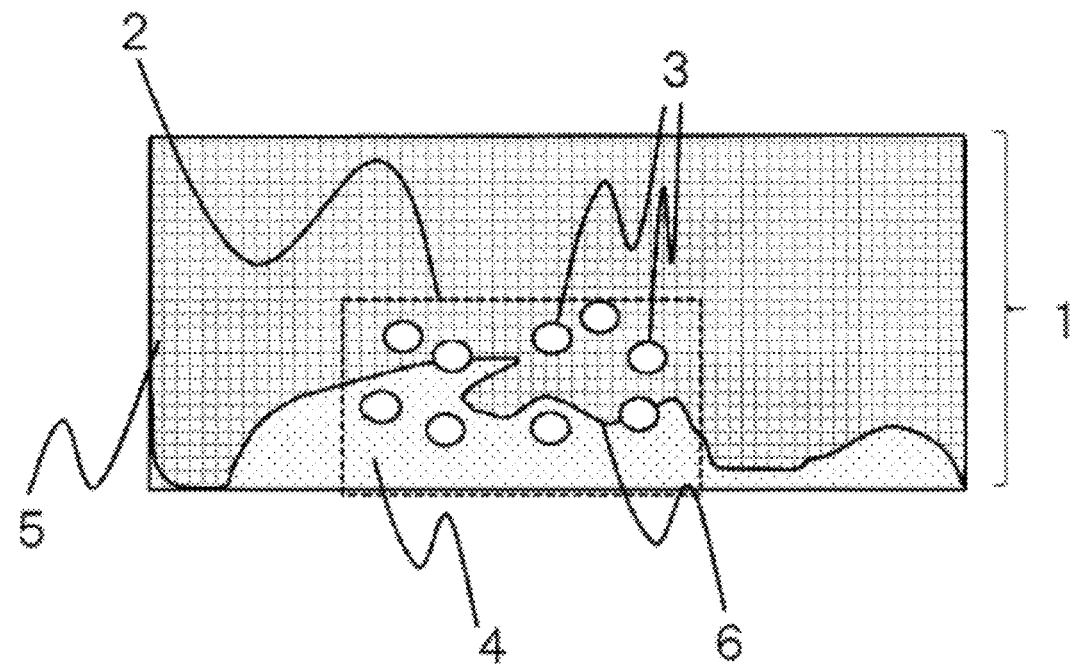

[FIG. 7]
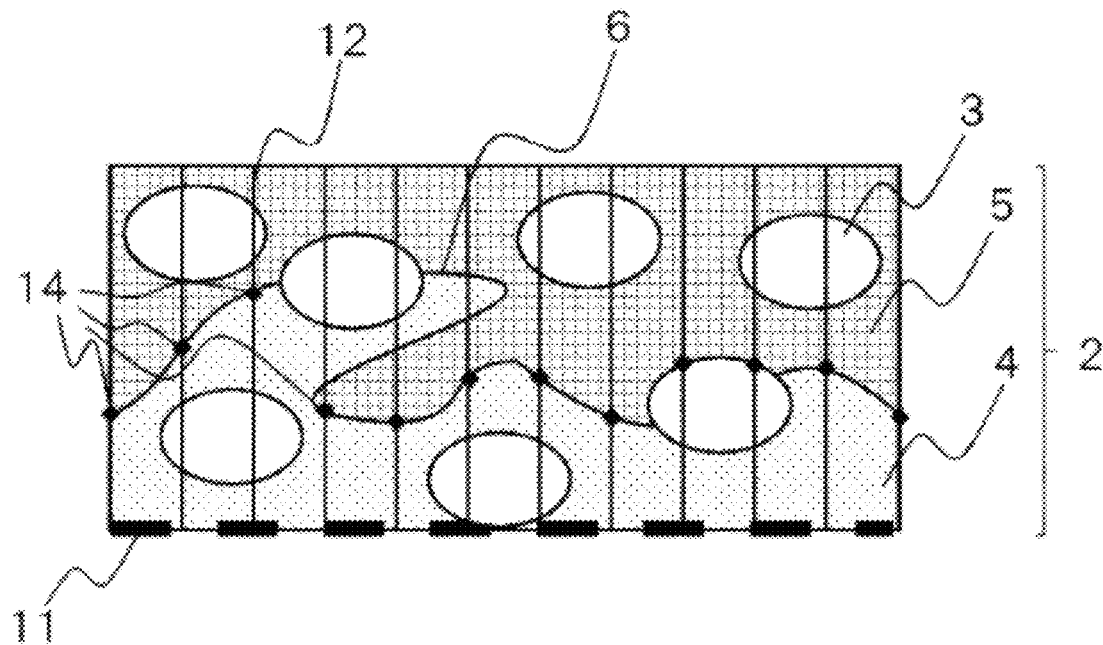
[FIG. 8]
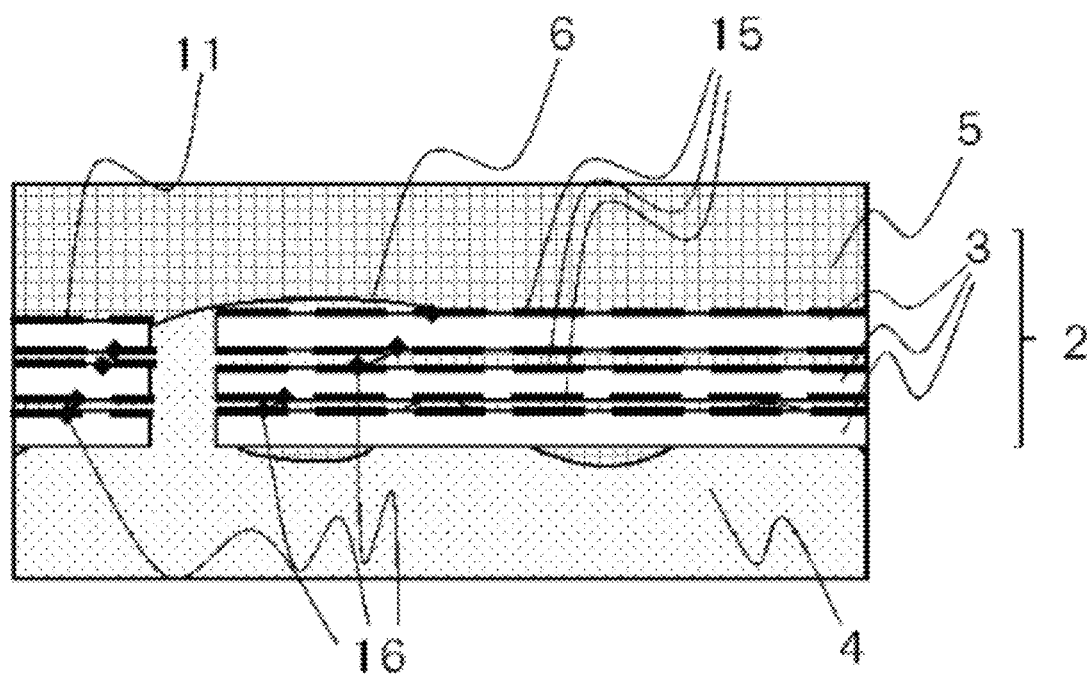

[FIG. 9]
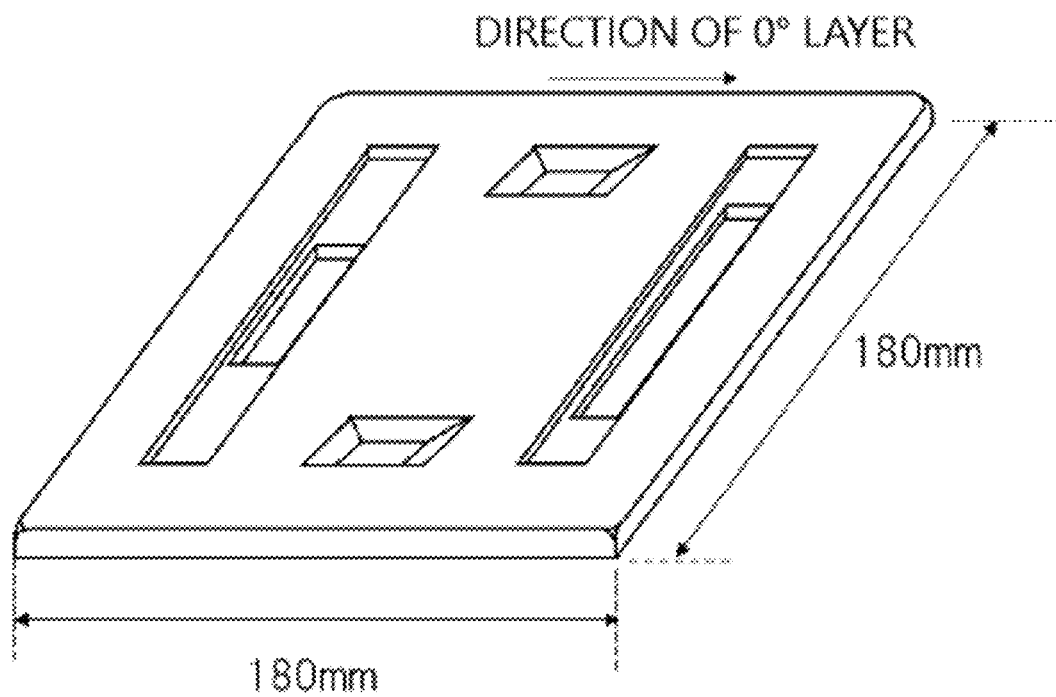

FIBER-REINFORCED PLASTIC AND PRODUCTION METHOD FOR FIBER-REINFORCED PLASTIC

CROSS REFERENCE TO RELATED APPLICATIONS

This application is the U.S. National Phase application of PCT/JP2021/027404, filed Jul. 21, 2021 which claims priority to Japanese Patent Application No. 2020-126652, filed Jul. 27, 2020, the disclosures of these applications being incorporated herein by reference in their entireties for all purposes.

FIELD OF THE INVENTION

The present invention relates to a fiber-reinforced plastic and a method for manufacturing the fiber-reinforced plastic.

BACKGROUND OF THE INVENTION

Fiber-reinforced plastics, which use a thermosetting resin or a thermoplastic resin as a matrix and are combined with reinforcing fibers such as carbon fiber and glass fiber, are lightweight, and are excellent in mechanical properties such as strength and rigidity, and heat resistance and corrosion resistance. Therefore, the fiber-reinforced plastics has been used in many fields such as aerospace, automobiles, railways, ships, civil engineering and construction, and sporting goods.

However, the fiber-reinforced plastics are not suitable for manufacturing parts or structures having complex shapes in a single molding step, and in the above applications, it is necessary to manufacture a member made of a fiber-reinforced plastic and then integrate the member with another member made of the same or different material. As a technique for integrating a fiber-reinforced plastic with another member made of the same or different material, mechanical joining methods using bolts, rivets, screws, or the like, and joining methods using adhesives are used.

The mechanical joining methods require a step of processing a joining part in advance, such as a hole drilling step, which leads to a prolonged manufacturing step and an increased manufacturing cost, and there is also a problem that a strength of material is lowered due to the holes. Also the joining methods using adhesives require a bonding step and a curing step including preparation of the adhesives and work of applying the adhesives, which leads to a prolonged manufacturing step, and there is also a problem that sufficient reliability cannot be obtained in terms of joining strength.

A fiber-reinforced plastic using a thermoplastic resin as a matrix resin can be joined to a member using another thermoplastic resin by welding, so that it can be said that a step can be relatively simplified. For example, Patent Literature 1 discloses a laminate made of a fiber-reinforced resin in which a thermosetting resin layer and a thermoplastic resin layer form an uneven interface inside a reinforcing fiber bundle, and describes that by joining the laminate to another member by welding through the thermoplastic resin layer of the laminate, a joined body having excellent joining strength can be obtained.

PATENT LITERATURE

Patent Literature 1: WO2004/060658

SUMMARY OF THE INVENTION

In the laminate using a thermoplastic resin described in Patent Literature 1, the interface between the thermosetting resin and the thermoplastic resin is positioned inside the reinforcing fiber bundle. Therefore, the reinforcing fiber bears the load to prevent interface separation between the thermosetting resin and the thermoplastic resin, and at the same time, excellent joining strength can be obtained when the laminate is welded to another member. However, the laminate is not necessarily suitable for applications where shape followability should be prioritized over strength.

An object of the present invention is to provide a fiber-reinforced plastic that can be joined to another member by welding through a thermoplastic resin, and that has excellent joining strength with another member and also has excellent shape followability.

In order to solve such problems, the present invention has the following configurations.

<1> A fiber-reinforced plastic, including a layer containing reinforcing fibers and a matrix in which a thermosetting resin and a thermoplastic resin are integrated, as at least one surface layer in a thickness direction, in which
  the reinforcing fibers form discontinuous reinforcing fiber bundles stacked randomly or form discontinuous reinforcing fiber bundles arranged in one direction,
  a part of the discontinuous reinforcing fiber bundles is in contact with both the thermosetting resin and the thermoplastic resin, and
  the thermoplastic resin is exposed on at least a part of a surface of the surface layer.

<2> The fiber-reinforced plastic according to <1>, in which in the surface layer, a region containing the thermosetting resin as a main component and a region containing the thermoplastic resin as a main component form an interface.

<3> The fiber-reinforced plastic according to <1> or <2>, in which
  in the surface layer, the thermoplastic resin includes a continuous region in the thickness direction from the surface, and
  a maximum thickness of a portion where the thermoplastic resin is in contact with the discontinuous reinforcing fiber bundles in the continuous region is 10 μm or more.

<4> The fiber-reinforced plastic according to any one of <1> to <3>, in which
  the surface layer has a content of the reinforcing fibers being 15 volume % or more and 70 volume % or less.

<5> The fiber-reinforced plastic according to any one of <1> to <4>, in which
  in the surface layer, the reinforcing fibers have an average fiber length in a range of 5 mm to 100 mm.

<6> The fiber-reinforced plastic according to any one of <1> to <5>, in which
  in the surface layer, the reinforcing fibers are at least one kind selected from the group consisting of carbon fibers and glass fibers.

<7> The fiber-reinforced plastic according to any one of <1> to <6>, in which
  the surface layer has a presence ratio of voids in contact with end portions in a longitudinal direction of the discontinuous reinforcing fiber bundles being 5 area % or less.

<8> The fiber-reinforced plastic according to any one of <1> to <7>, in which
  the surface layer has a longitudinal impregnation distance of 20 μm or more.

<9> The fiber-reinforced plastic according to any one of <1> to <8>, in which
in the surface layer, the thermoplastic resin is present between the discontinuous reinforcing fiber bundles.
<10> The fiber-reinforced plastic according to <9>, in which
the thermoplastic resin occupies between adjacent discontinuous reinforcing fiber bundles arbitrarily selected.
<11> The fiber-reinforced plastic according to any one of <1> to <10>, in which
both surface layers in the thickness direction contain the discontinuous reinforcing fiber bundles, the thermoplastic resin, and the thermosetting resin, and
the thermoplastic resin is exposed on surfaces of both the surface layers.
<12> The fiber-reinforced plastic according to any one of <1> to <11>, in which
at least a part of the discontinuous reinforcing fiber bundles constituting the fiber-reinforced plastic is arranged in an out-of-plane direction.
<13> A method for manufacturing the fiber-reinforced plastic described in any one of <1> to <12>, including:
a step 1 of impregnating the thermosetting resin with a reinforcing fiber bundle;
a step 2 of impregnating the thermoplastic resin with the reinforcing fiber bundle;
a step 3 of cutting the reinforcing fiber bundle to form discontinuous reinforcing fiber bundles;
a step 4 of laminating a required number of base materials constituting the fiber-reinforced plastic so that the thermoplastic resin is exposed on at least one surface in a thickness direction; and
a step 5 of molding the fiber-reinforced plastic by heating and pressing, in which the step 5 is performed after the steps 1 to 4 are performed, or is performed simultaneously with the step 2 after the steps 1, 3 and 4 are performed, or is performed simultaneously with the step 1 after the steps 2, 3 and 4 are performed.
<14> The method for manufacturing the fiber-reinforced plastic according to <13>, further including:
a step 6 of flowing so that end portions of the discontinuous reinforcing fiber bundles in a longitudinal direction are in contact with the thermosetting resin or the thermoplastic resin in the surface layer where the thermoplastic resin is exposed.
<15> The method for manufacturing the fiber-reinforced plastic according to <13> or <14>, in which in the step 6,
in the surface layer where the thermoplastic resin is exposed, at least a part of the discontinuous reinforcing fiber bundles is in contact with both the thermosetting resin and the thermoplastic resin, and
the flowing is performed so that at least one of the reinforcing fibers constituting the reinforcing fiber bundles and the thermoplastic resin are continuously in contact with each other in the longitudinal direction from an end portion of the reinforcing fiber in the longitudinal direction.

In the fiber-reinforced plastic according to the present invention, the thermoplastic resin is exposed on at least a part of the surface of the surface layer, so that the fiber-reinforced plastic can be joined to another member by welding through the thermoplastic resin. Since a part of the discontinuous reinforcing fiber bundles is in contact with both the thermosetting resin and the thermoplastic resin, separation of the interface between the thermosetting resin and the thermoplastic resin is less likely to occur. Furthermore, since the reinforcing fibers are discontinuous reinforcing fiber bundles, the shape followability is excellent, and therefore, the present invention is particularly useful in applications where both strength and shape followability are required.

BRIEF DESCRIPTION OF DRAWINGS

FIG. 1 is a schematic plan view of one embodiment of a fiber-reinforced plastic according to the present invention.
FIG. 2 is a schematic cross-sectional view of one embodiment of the fiber-reinforced plastic of the present invention.
FIG. 3 is a schematic diagram of one embodiment of a prepreg with slits that can be used in manufacturing the fiber-reinforced plastic according to the present invention.
FIG. 4 is a schematic cross-sectional view of one embodiment of the fiber-reinforced plastic according to the present invention, and helps explain a method for measuring a maximum impregnation distance.
FIG. 5 is a schematic cross-sectional view of one embodiment of the fiber-reinforced plastic according to the present invention.
FIG. 6 is a schematic cross-sectional view of one embodiment of the fiber-reinforced plastic according to the present invention.
FIG. 7 is a schematic cross-sectional view of one embodiment of the fiber-reinforced plastic according to the present invention, and helps explain a method for measuring an average roughness height Rc.
FIG. 8 is a schematic cross-sectional view of one embodiment of the fiber-reinforced plastic according to the present invention, and helps explain a method for measuring a longitudinal impregnation distance.
FIG. 9 illustrates an example of the fiber-reinforced plastic according to the present invention, and illustrates an example of a shape of the fiber-reinforced plastic according to the present invention.

DETAILED DESCRIPTION OF EMBODIMENTS OF THE INVENTION

[Fiber-Reinforced Plastic]
Hereinafter, a fiber-reinforced plastic according to the present invention will be described with reference to the drawings as appropriate, but the drawings are used for convenience in order to facilitate understanding of the present invention, and do not limit the present invention in any way. Note that in this description, the term "cross section of the fiber-reinforced plastic" refers to a cross section cut parallel to a thickness direction, unless otherwise specified.

The fiber-reinforced plastic according to the present invention is a fiber-reinforced plastic including a layer containing reinforcing fibers and a matrix in which a thermosetting resin and a thermoplastic resin are integrated, as at least one surface layer in a thickness direction, in which
the reinforcing fibers form discontinuous reinforcing fiber bundles stacked randomly or form discontinuous reinforcing fiber bundles arranged in one direction,
a part of the discontinuous reinforcing fiber bundles is in contact with both the thermosetting resin and the thermoplastic resin, and
the thermoplastic resin is exposed on at least a part of a surface of the surface layer.

The fiber-reinforced plastic according to the present invention contains a plurality of discontinuous reinforcing fiber bundles as the reinforcing fibers. The discontinuous reinforcing fiber bundles are constituted by a plurality of discontinuous reinforcing fibers. By bundling the discontinuous reinforcing fibers, a fiber-reinforced plastic having excellent rigidity can be obtained.

Examples of the reinforcing fibers include carbon fibers, glass fibers, metal fibers, aromatic polyamide fibers, polyaramid fibers, alumina fibers, silicon carbide fibers, boron fibers, and basalt fibers. Among these examples, reinforcing fibers such as carbon fibers and glass fibers are preferable from the viewpoint of elastic modulus, strength, and practical use. These reinforcing fibers may be used alone, or in combination of two or more thereof as appropriate.

Carbon fibers are particularly preferably used as the reinforcing fibers because of their low specific gravity, high strength, and high elastic modulus. Examples of commercially available carbon fiber products include "Torayca®" T800G-24K, "Torayca®" T800S-24K, "Torayca®" T700G-24K, "Torayca®" T700S-24K, "Torayca®" T300-3K, and "Torayca®" T1100G-24K (all manufactured by Toray Industries, Inc.).

These reinforcing fibers may be surface-treated. Examples of the surface treatment include metal adhesion treatment, coupling agent treatment, sizing agent treatment, and additive adhesion treatment.

In the present invention, as illustrated in FIG. 1, the discontinuous reinforcing fiber bundles 2 can be present in a randomly stacked state in a surface layer of the fiber-reinforced plastic. Examples of a method for obtaining the surface layer of the fiber-reinforced plastic according to the present invention include a method of stacking the discontinuous reinforcing fiber bundles obtained by cutting reinforcing fiber bundles in advance on a carrier so that the bundles are stacked one on another, and then impregnating a thermosetting resin and a thermoplastic resin thereinto, to form a base material. Examples of the randomly stacked discontinuous reinforcing fiber bundles in the present invention include a sheet molding compound (SMC). Since the discontinuous reinforcing fiber bundles are randomly stacked, the shape followability can be improved, which is advantageous in applications where shape followability should be prioritized over strength.

In the present invention, the discontinuous reinforcing fiber bundles 2 can be randomly stacked. Here, when the surface layer of the fiber-reinforced plastic according to the present invention is viewed in a plane, and an orientation direction, projected onto the plane, of one discontinuous reinforcing fiber bundle randomly selected from those having overlapping portions of the discontinuous reinforcing fiber bundles is taken as a reference, the state where the discontinuous reinforcing fiber bundles are randomly stacked means that: an average value of smaller angles (hereinafter, may also be referred to as "two-dimensional orientation angle") among angles formed on the plane by intersecting orientation directions of 20 discontinuous reinforcing fiber bundles randomly selected separately from the one discontinuous reinforcing fiber bundle is 10 degrees or more and 80 degrees or less (in the case where the discontinuous reinforcing fiber bundles do not intersect, an angle formed by extension lines of the orientation directions of the discontinuous reinforcing fiber bundles intersecting on the plane is used).

Note that the orientation direction projected onto the plane, of the discontinuous reinforcing fiber bundle is determined by selecting one reinforcing fiber contained in the discontinuous reinforcing fiber bundle visually recognized in a plan view, and using a direction of a straight line connecting visible end portions in the longitudinal direction of the selected reinforcing fiber as the orientation direction. The reinforcing fibers to be selected are freely selected, but it is preferable that it exists near a center of the discontinuous reinforcing fiber bundle in a fiber orthogonal direction and the surrounding reinforcing fibers included in the same discontinuous reinforcing fiber bundle are substantially parallel to the selected reinforcing fiber. In the case where the extension lines of the orientation directions of the discontinuous reinforcing fiber bundles do not intersect, the two-dimensional orientation angle is 0 degrees.

In the present invention, the average value of the two-dimensional orientation angles is more preferably 30 degrees or more and 60 degrees or less, still more preferably 40 degrees or more and 50 degrees or less, and the closer to an ideal angle of 45 degrees, the more preferable.

In the present invention, the discontinuous reinforcing fiber bundles in the surface layer can be arranged in one direction. In the case where the discontinuous reinforcing fiber bundles are arranged in one direction, the strength of the fiber-reinforced plastic can be made excellent, and thus it is advantageous in applications where strength should be prioritized over shape followability. Here, the state where the discontinuous reinforcing fiber bundles are arranged in one direction means that the average value of the two-dimensional orientation angles is 0 degrees or more and less than 10 degrees.

Examples of a method for obtaining the surface layer of the fiber-reinforced plastic according to the present invention include a method of forming a base material by cutting at least a part of the reinforcing fiber bundles contained in a prepreg in which the reinforcing fibers are arranged in one direction, to form the discontinuous reinforcing fiber bundles. Examples of such a prepreg include a prepreg 7 with slits as illustrated in FIG. 3.

Note that in the case where the prepreg 7 with slits is used, the slits inserted into the prepreg may be orthogonal slits or oblique slits with respect to a longitudinal direction 9 of the reinforcing fiber bundles, and may be a pair of oblique slits 8 such that an angle θ with the longitudinal direction 9 of the reinforcing fiber bundles is ±α as illustrated in FIG. 3. The shape of the slits and the shape of the discontinuous reinforcing fiber bundles are not particularly limited. In addition to the slits dividing the reinforcing fibers in the longitudinal direction as illustrated in FIG. 3, the prepreg with slits may include slits parallel to the reinforcing fibers dividing the fiber bundles in a width direction.

The fiber-reinforced plastic according to the present invention includes a surface layer containing the reinforcing fibers forming the discontinuous reinforcing fiber bundles existing in the above-described state and a matrix in which a thermosetting resin and a thermoplastic resin are integrated. Furthermore, a part of the discontinuous reinforcing fiber bundles is in contact with both the thermosetting resin and the thermoplastic resin, and the thermoplastic resin is present on (hereinafter may also be said as "exposed on") the surface of the surface layer.

As a result, since good welding with another member made of the same or different types of material is possible through the thermoplastic resin, compared with fiber-reinforced plastics containing only a thermosetting resin and reinforcing fibers, a time required for the joining step can be shortened and molding of a structural member can be speeded up.

Examples of the shape of the fiber-reinforced plastic according to the present invention include, but are not limited thereto, a flat plate shape having unevenness on a side surface, a shape having a flat portion and a curved surface portion such as an L-shaped member, and a shape in which at least a part of the discontinuous reinforcing fiber bundles is oriented in an out-of-plane direction, such as a rib shape or a concave-convex shape.

Note that the state where the discontinuous reinforcing fiber bundles are oriented in the out-of-plane direction means that when a discontinuous reinforcing fiber bundle on the surface layer is arranged horizontally, there is a combination in which a part of another discontinuous reinforcing fiber bundle on the same surface layer makes an angle of 5 degrees or more with respect to a horizontal direction.

In the fiber-reinforced plastic according to the present invention, an average fiber length of the reinforcing fibers constituting the discontinuous reinforcing fiber bundles in the surface layer is preferably 5 mm or more and 100 mm or less. In the case where the average fiber length is 5 mm or more, the reinforcing fibers present at the interface between the thermosetting resin and the thermoplastic resin can sufficiently bear loads. Therefore, a stress applied to the interface between the thermosetting resin and the thermoplastic resin is reduced, and as a result, separation of the interface is prevented, so that an effect of improving the joining strength is more likely to appear. In the case where the average fiber length is 100 mm or less, the fiber-reinforced plastic is excellent in shape followability when being molded.

It is preferable that fiber lengths of the reinforcing fibers constituting the discontinuous reinforcing fiber bundles contained in the surface layer are substantially the same. In the case where the fiber lengths are substantially the same, variations in mechanical properties of the fiber-reinforced plastic according to the present invention can be reduced.

Here, the state where the fiber lengths are substantially the same means that a ratio of the number of reinforcing fibers longer or shorter than the average fiber length (hereinafter may be referred to as "fiber bundle length") of the reinforcing fibers constituting one discontinuous reinforcing fiber bundle contained in the surface layer by 10 mm or more is 10% or less with respect to all the reinforcing fibers contained in the discontinuous reinforcing fiber bundle. The ratio of the number of such reinforcing fibers is preferably as close to 0% as possible, but in the manufacturing steps, deviation of base materials, chipping of blades, and the like may occur, which makes it unable to cut as designed, and the ratio of the number of such reinforcing fibers may be greater than 0%.

Furthermore, among the discontinuous reinforcing fiber bundles contained in the surface layer, it is more preferable that all the discontinuous reinforcing fiber bundles other than those in contact with side surfaces have substantially the same average fiber length. The state where the discontinuous reinforcing fiber bundles have substantially the same average fiber length means that among the discontinuous reinforcing fiber bundles contained in the surface layer, a ratio of the number of discontinuous reinforcing fiber bundles having a fiber bundle length longer or shorter than the average value of the fiber bundle lengths by 10 mm or more is 10% or less. The ratio of such discontinuous reinforcing fiber bundles is preferably as close to 0% as possible, but in the manufacturing steps, deviation of base materials, chipping of blades, and the like may occur, which makes it unable to cut as designed, and the ratio of the number of such reinforcing fiber bundles may be greater than 0%.

Note that in the fiber-reinforced plastic according to the present invention, the surface on which the thermoplastic resin is exposed may be one side or both sides. That is, in the fiber-reinforced plastic according to the present invention, both surface layers in the thickness direction may include the layer containing the discontinuous reinforcing fiber bundles, the thermoplastic resin, and the thermosetting resin, and the thermoplastic resin may be exposed on both the surface layers.

Hereinafter, in the fiber-reinforced plastic according to the present invention, a surface including a portion where the thermoplastic resin contained in the surface layer is exposed will be referred to as a "joining surface". Note that in the case where the thermoplastic resin is exposed on both sides of the fiber-reinforced plastic, both sides are the "joining surface".

The ratio of the thermoplastic resin occupying the surface of the joining surface is not particularly limited, and the thermoplastic resin may be exposed over the entire surface of the joining surface, or may be exposed only on a part of the joining surface. The larger the ratio of the thermoplastic resin exposed on the joining surface, the larger an area that can be used for joining, and thus the higher a joining force can be expected. The ratio of the thermoplastic resin occupying the surface of the joining surface is preferably 5 area % or more, more preferably 10 area % or more, and still more preferably 20 area % or more.

Furthermore, in the fiber-reinforced plastic according to the present invention, a part of the discontinuous reinforcing fiber bundles is in contact with both the thermosetting resin and the thermoplastic resin. By forming such a structure, when the joining surface of the fiber-reinforced plastic according to the present invention is used to join to the same or different material, and a load is applied, the strong reinforcing fibers in the discontinuous reinforcing fiber bundles straddling the interface between the thermosetting resin and the thermoplastic resin bear the load. Therefore, the load applied to the interface between the thermosetting resin and the thermoplastic resin is reduced, and separation of the interface is prevented, thereby improving the apparent interface strength between the thermosetting resin and the thermoplastic resin.

Since the reinforcing fibers are in contact with both the thermosetting resin and the thermoplastic resin, a shape of the interface between the thermosetting resin and the thermoplastic resin becomes complicated. Therefore, an improvement in the apparent interface strength is further expected due to the increased contact area between the thermosetting resin and the thermoplastic resin and the occurrence of catching by unevenness.

In the fiber-reinforced plastic according to the present invention, the contact surface between the thermosetting resin and the thermoplastic resin may take any form, such as forming a mixed layer, but as a more preferable form, as illustrated in FIG. 2, in the surface layer, it is preferable that an interface 6 is formed by a region containing the thermosetting resin 5 as a main component and a region containing the thermoplastic resin 4 as a main component. By adopting such an interface structure, it is possible to easily confirm the formation of a region in which the thermoplastic resin is continuous in the thickness direction from the surface, which will be described later, in the fiber-reinforced plastic of the present invention.

In the surface layer of the fiber-reinforced plastic according to the present invention, the thermoplastic resin is preferably present between the discontinuous reinforcing fiber bundles. With such a configuration, a structure in which the shape of the interface between the thermosetting resin and the thermoplastic resin is complicated can be obtained, and an improvement in the joining strength can be expected. Such a structure can be confirmed by, for example, cutting out and observing a cross section parallel to a thickness direction with reference to a longitudinal direction of a certain discontinuous reinforcing fiber bundle in the surface layer.

Here, the presence of the thermoplastic resin between the discontinuous reinforcing fiber bundles will be described with reference to a cross section illustrated in FIG. 2 as an example. In a cross section cut along the thickness direction of the fiber-reinforced plastic 1, a straight line is connected from an end portion in the longitudinal direction of one discontinuous reinforcing fiber bundle 2 to a longitudinal end or side surfaces of another discontinuous reinforcing fiber bundle 2 without passing through any reinforcing fibers so as to obtain the shortest distance between the two reinforcing fiber bundles. In this case, the straight line passes through the thermoplastic resin 4, the thermosetting resin 5, and the voids existing between the fiber bundles, and the state where a straight line whose total length passing through the thermoplastic resin 4 is 30% or more of the total length of the straight line can be drawn means that the thermoplastic resin 4 exists between the discontinuous reinforcing fiber bundles 2.

Among the straight lines whose total length that passes through the thermoplastic resin is 30% or more among the straight lines drawn between the discontinuous reinforcing fiber bundles, a ratio of the number of the straight lines whose total length that passes through the thermoplastic resin is 50% or more is preferably 30% or more, more preferably 50% or more, and still more preferably 80% or more.

In the fiber-reinforced plastic according to the present invention, the thermoplastic resin preferably occupies between adjacent discontinuous reinforcing fiber bundles arbitrarily selected. With such a configuration, the thermoplastic resin is sufficiently impregnated between the discontinuous reinforcing fiber bundles, and as a result, the interface between the thermosetting resin and the thermoplastic resin can have a more complicated structure, and the improvement in the joining strength is expected.

Here, "the thermoplastic resin occupies between adjacent discontinuous reinforcing fiber bundles arbitrarily selected" means that among the straight lines between the discontinuous reinforcing fiber bundles, a straight line whose total length that passes through the thermoplastic resin 4 is 100% can be drawn. It is more preferable that a straight line whose total length that passes through the thermoplastic resin is 100% can be drawn between the plurality of discontinuous reinforcing fiber bundles.

In the fiber-reinforced plastic according to the present invention, a volume content of the reinforcing fibers in the surface layer is preferably 15 volume % or more and 70 volume % or less. In the case where the volume content is 15 volume % or more, the contents of the thermosetting resin and the thermoplastic resin are not too large compared with the discontinuous reinforcing fiber bundles, and the specific strength and the specific elastic modulus tend to be excellent. In the case where the volume content is 70 volume % or less, poor impregnation of the thermosetting resin and the thermoplastic resin is less likely to occur, and voids in the obtained fiber-reinforced plastic tend to be reduced. The volume content is more preferably 20 volume % or more and 70 volume % or less, and still more preferably 25 volume % or more and 70 volume % or less.

Here, the volume content of the reinforcing fibers in the surface layer means a volume content in an area where the reinforcing fibers are present, and is measured and calculated excluding an area that does not contain the reinforcing fibers on the surface or between layers of the fiber-reinforced plastic or has a small number of reinforcing fibers and is mostly occupied by resin. The measurement is performed at a plurality of locations, preferably at least 5 locations, the volume content of the reinforcing fibers is calculated for each location, and an average value thereof is taken as the volume content of the reinforcing fibers in the surface layer.

In the fiber-reinforced plastic according to the present invention, it is preferable that the surface layer includes a region in which the thermoplastic resin is continuous in the thickness direction from the surface thereof, and a maximum thickness (hereinafter, the thickness may be referred to as "maximum impregnation distance") of a portion where the thermoplastic resin is in contact with the discontinuous reinforcing fiber bundle in this region is 10 μm or more, more preferably 20 μm or more, and still more preferably 50 μm or more, from the viewpoint of making it easier for the discontinuous reinforcing fiber bundles to come into contact with the thermoplastic resin, making it easier for the reinforcing fibers to bear the load acting on the joining surface during joining, and further improving the joining strength.

Here, the region where the thermoplastic resin is continuous from the surface in the thickness direction means a region where a boundary of the thermoplastic resin is continuous in the fiber-reinforced plastic when observing a cross section in the thickness direction as illustrated in FIG. 4, and for example, as illustrated in FIG. 5, when observing a cross section in the thickness direction, a region that is not continuous from the thermoplastic resin 4 where the boundary is exposed, such as the thermoplastic resin 4', is excluded.

A line drawn parallel to the joining surface starting from a point where the thermoplastic resin continuous in the thickness direction first contacts the reinforcing fiber bundles in the thickness direction is used as a reference line 11. The maximum impregnation distance means, as illustrated in FIG. 4, a distance from the reference line 11 to the farthest intersection among intersections (measurement points 13 indicated by black dots on the vertical baseline 12 in FIG. 4) of a vertical baseline 12 drawn from the reference line 11 and boundary lines where the region where the thermoplastic resin is continuous in the thickness direction from the surface is in contact with other constituent elements (the thermosetting resin, the reinforcing fibers, or the voids).

In the present invention, in a cross section in an arbitrary direction in the case where the discontinuous reinforcing fiber bundles are randomly stacked, or in a cross section forming an angle of 45 degrees with respect to the arrangement direction of the discontinuous reinforcing fiber bundles in the case where the discontinuous reinforcing fiber bundles are arranged in one direction, an average roughness height Rc defined by JIS B0601 (2001) of a cross-sectional curve, which will be described later, is preferably 3.5 μm or more, and more preferably 10 μm or more. Such a structure is believed to be formed by the discontinuous reinforcing fiber bundles, and by the flow of the thermosetting resin and the thermoplastic resin.

In the case where the average roughness height Rc is 3.5 μm or more, the contact area between the thermoplastic resin and the thermosetting resin increases, and the catching due to unevenness becomes complicated, so that a further improvement in the apparent interface strength is expected. Furthermore, the discontinuous reinforcing fibers existing on the interface are chemically and/or physically bonded to the thermosetting resin and the thermoplastic resin, and the interfacial strength with the thermosetting resin and the thermoplastic resin will be improved.

A known method can be used as a method for measuring the average roughness height Rc. Examples of the method include a method of measuring from a cross-sectional image of the fiber-reinforced plastic, acquired by using and X-ray CT, a method of measuring from an elemental analysis mapping image by an energy dispersive X-ray spectrometer (EDS), and a method of measuring from a cross-sectional observation image by an optical microscope, a scanning electron microscope (SEM), or a transmission electron microscope (TEM).

In image observation, the thermosetting resin and/or the thermoplastic resin may be dyed to adjust a contrast. In an image obtained by any of the above methods, the average roughness height Rc of the cross-sectional curve is measured in a 500 μm square range.

An example of the method for measuring the average roughness height Rc is described with reference to FIG. 6 and FIG. 7. FIG. 6 is a schematic cross-sectional view of the fiber-reinforced plastic according to the present invention. Among the interface 6 illustrated in FIG. 6 where the thermosetting resin 5 and the thermoplastic resin 4 are in contact with each other, the average roughness height Rc is measured in a region including the discontinuous reinforcing fiber bundles 2 containing the discontinuous reinforcing fibers 3 in contact with both thermosetting resin 5 and thermoplastic resin 4.

FIG. 7 is an enlarged view of the region used for measuring the average roughness height Rc in FIG. 6. In FIG. 7, the thermosetting resin 5 is in contact with thermoplastic resin 4 at the interface 6. At the interface 6, there are a plurality of discontinuous reinforcing fibers 3 contained in a certain discontinuous reinforcing fiber bundle. The vertical baselines 12 are drawn from the reference line 11 to pass through the thermoplastic resin 4 toward the thermosetting resin 5 at an interval of 5 μm. A line obtained by plotting measurement points 14 where the vertical baselines 12 drawn from the reference line 11 intersect the thermosetting resin 5 for the first time and then connecting the plotted points is defined as the cross-sectional curve. Filtering processing based on JIS B0601 (2001) is performed on the obtained cross-sectional curve, and the average roughness height Rc of the cross-sectional curve is calculated.

A basis weight of the thermoplastic resin used in the surface layer of the fiber-reinforced plastic according to the present invention is preferably 10 $g/m^2$ or more, and more preferably 20 $g/m^2$ or more. In the case where the basis weight of the thermoplastic resin is 10 $g/m^2$ or more, a sufficient thickness for exhibiting the excellent joining strength can be obtained.

An upper limit of the basis weight of the thermoplastic resin in the surface layer is not particularly limited, but 500 $g/m^2$ or less is preferable so that the content of the thermoplastic resin is not too large compared with the content of the reinforcing fibers, and a fiber-reinforced plastic having excellent specific strength and specific elastic modulus can be obtained. Here, the basis weight of the thermoplastic resin refers to a mass (g) of the thermoplastic resin contained per 1 $m^2$ of the surface layer of the fiber-reinforced plastic.

The amount of the reinforcing fibers per unit area in the surface layer of the fiber-reinforced plastic according to the present invention is preferably 30 $g/m^2$ or more and 2,000 $g/m^2$ or less. In the case where the amount of the reinforcing fibers is 30 $g/m^2$ or more, the number of base materials required to obtain a predetermined thickness can be reduced when molding the fiber-reinforced plastic, and the work tends to be simple. On the other hand, in the case where the amount of the reinforcing fibers is 2,000 $g/m^2$ or less, the drapeability of the fiber-reinforced plastic as a precursor is likely to be improved.

In the surface layer of the fiber-reinforced plastic according to the present invention, a presence ratio of the voids in contact with end portions in the longitudinal direction of the discontinuous reinforcing fiber bundles is preferably 5 area % or less. With such a configuration, stress concentration at the end portions of the discontinuous reinforcing fiber bundles in the longitudinal direction can be prevented and a fiber-reinforced plastic excellent in molding quality and strength can be obtained.

The presence ratio of the voids in contact with the end portions of the discontinuous reinforcing fiber bundle in the longitudinal direction is measured as follows. A plurality of cross-sectional images in an arbitrary direction in the case where the discontinuous reinforcing fiber bundles are randomly stacked, or a plurality of cross-sectional images in the thickness direction, which is parallel to the arrangement direction in the case where the discontinuous reinforcing fiber bundles are arranged in one direction, are acquired. Next, in each acquired image, an area of the voids in contact with the end portions of the discontinuous reinforcing fiber bundles in the longitudinal direction and an area of the portion corresponding to the surface layer are measured. Finally, in all images, the value obtained by dividing the total area of the measured voids by the total area of the portion corresponding to the surface layer and multiplying by 100 was calculated as the presence ratio (%) of the voids in contact with the end portions of the discontinuous reinforcing fiber bundles in the longitudinal direction. The presence ratio of the voids in contact with the end portions of the discontinuous reinforcing fiber bundles in the longitudinal direction is more preferably 3 area % or less, and still more preferably 1 area % or less.

Note that the cross-sectional image of the fiber-reinforced plastic can be obtained by, for example, a method including cutting the fiber-reinforced plastic in the thickness direction at an arbitrary location, embedding and polishing, and then observing with an optical microscope.

In the surface layer of the fiber-reinforced plastic according to the present invention, it is preferable that the reinforcing fibers and the thermoplastic resin are in continuous contact with each other in the longitudinal direction of the fibers from the end portions of the reinforcing fibers in the longitudinal direction (hereinafter, the length of this contacting portion may be referred to as the "longitudinal impregnation distance"). With such a configuration, a structure in which the shape of the interface between the thermosetting resin and the thermoplastic resin passing through the reinforcing fibers is more complicated can be obtained, and an improvement in the joining strength can be expected. Such a structure is believed to be formed by the discontinuous reinforcing fiber bundles, and the flow of the thermosetting resin and the thermoplastic resin.

As illustrated in FIG. 8, the length of continuous contact between the reinforcing fibers and the thermoplastic resin in the longitudinal direction of the fibers from the end portions in the longitudinal direction of the reinforcing fibers refers to a distance starting from an end portion of an arbitrary discontinuous reinforcing fiber 3 that is in contact with the thermoplastic resin at the end portion in the longitudinal direction, to an intersection (a measurement point 16 indicated by a black dot on the reference line 15 in FIG. 8) with the boundary line where the thermoplastic resin 4 is in contact with the thermosetting resin 5 or the voids for the first time, using a line drawn along a side surface of the reinforcing fiber as a reference line 15.

More specifically, the longitudinal impregnation distance is measured as follows. First, five or more discontinuous reinforcing fiber bundles located near the surface layer are randomly selected, and cross-sectional images thereof in the thickness direction are acquired so as to be parallel to the orientation direction of the reinforcing fibers constituting the discontinuous reinforcing fiber bundles. Next, in each acquired image, for the reinforcing fiber that is in contact with both the thermosetting resin and the thermoplastic resin, from the end portion in the longitudinal direction of the reinforcing fiber that is in contact with the thermoplastic resin, a reference line is drawn along the longitudinal direction of the reinforcing fiber. Points where the reference lines intersect the thermosetting resin or the voids for the first time are extracted, distances thereof from the end portions are measured, and an average value of all measured values is taken as the longitudinal impregnation distance. In measuring the longitudinal impregnation distance, when cutting parallel to the thickness direction of the fiber-reinforced plastic, the side surface close to the surface layer, of the reinforcing fiber closest to the surface layer in the thickness direction where the thermoplastic resin of the surface layer is exposed shall be excluded from the measurement target.

In the fiber-reinforced plastic according to the present invention, the longitudinal impregnation distance is preferably 20 µm or more, more preferably 50 µm or more, and still more preferably 100 µm or more, from the viewpoint that the reinforcing fibers can easily bear the load acting on the joining surface and the joining strength is further improved.

The fiber-reinforced plastic according to the present invention may be made of only the surface layer, or may have a layer structure containing layers other than the surface layer. By having such a layer structure, the thickness of the fiber-reinforced plastic according to the present invention can be increased, and the fiber-reinforced plastic according to the present invention can be utilized for structural members. Layers other than the surface layer may be a layer containing continuous or discontinuous reinforcing fibers and a matrix made of a thermosetting resin and/or a thermoplastic resin. There are no particular restrictions on the types of layers that constitute such a layer structure.

In the fiber-reinforced plastic according to the present invention, a resin layer that does not contain reinforcing fibers and is made of a thermosetting resin and/or a thermoplastic resin may be present.

In the fiber-reinforced plastic according to the present invention, another member (hereinafter sometimes referred to as "adherend") can be joined to the thermoplastic resin present on the joining surface of the fiber-reinforced plastic and integrated (welded) with the fiber-reinforced plastic through the thermoplastic resin by some heating method.

Examples of the adherend include members containing a thermosetting resin and/or a thermoplastic resin, and members containing a metal. A member made of the fiber-reinforced plastic according to the present invention can also be used as the adherend. A method for integrating the fiber-reinforced plastic according to the present invention and the adherend is not particularly limited, and examples thereof include hot welding, vibration welding, ultrasonic welding, laser welding, resistance welding, induction welding, insert injection molding, and outsert injection welding.

Examples of the thermosetting resin contained in the matrix in the fiber-reinforced plastic according to the present invention include unsaturated polyester resins, vinyl ester resins, epoxy resins, phenol resins, urea resins, melamine resins, thermosetting polyimide resins, cyanate ester resins, bismaleimide resins, benzoxazine resins, or copolymers or modified products thereof, and resins in which at least two of these resins are blended. An elastomer or rubber component may be added to the thermosetting resin to improve impact resistance. The fiber-reinforced plastic according to the present invention may contain a curing agent or a curing accelerator in order to control curing.

Among these, epoxy resins, phenol resins, unsaturated polyester resins, vinyl ester resins, thermosetting polyimide resins, cyanate ester resins, bismaleimide resins, and benzoxazine resins are preferable from the viewpoint of practicality and versatility, and epoxy resins are more preferable.

Epoxy resins are preferable because of their excellent mechanical properties, heat resistance, and adhesiveness to reinforcing fibers. Examples of a main agent of the epoxy resins can include bisphenol epoxy resins such as bisphenol A epoxy resin, bisphenol F epoxy resin, bisphenol AD epoxy resin, and bisphenol S epoxy resin, brominated epoxy resins such as tetrabromobisphenol A diglycidyl ether, epoxy resins having a biphenyl skeleton, epoxy resins having a naphthalene skeleton, epoxy resins having a dicyclopentadiene skeleton, novolak epoxy resins such as phenol novolak epoxy resins and cresol novolak epoxy resins, glycidylamine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine, resorcinol diglycidyl ether, and triglycidyl isocyanurate.

Examples of the thermoplastic resin contained in the matrix in the fiber-reinforced plastic according to the present invention include polyester resins such as polyethylene terephthalate, polybutylene terephthalate, polytrimethylene terephthalate, polyethylene naphthalate, and liquid crystal polyester; polyolefins such as polyethylene, polypropylene, and polybutylene; polyamides such as polyamide 6 and polyamide 66; polyarylene ether ketones such as polyketones, polyether ketones, polyether ether ketones, and polyether ketone ketones; styrene resins; urethane resins; polyoxymethylene; polycarbonate; polymethyl methacrylate; polyvinyl chloride; polyphenylene sulfide; polyphenylene ether; modified polyphenylene ether; polyimide, polyamideimide; polyetherimide; polysulfone; modified polysulfone; polyethersulfone; polyarylate; polyethernitrile; phenolic resins; and phenoxy resins. These thermoplastic resins may be copolymers or modified products of the above resins, and/or blended resins of two or more kinds thereof.

Among these, from the viewpoint of heat resistance, one or two or more selected from polyarylene ether ketone, polyphenylene sulfide, and polyetherimide is preferably contained in the thermoplastic resin in an amount of 60 mass % or more. An elastomer or a rubber component may be added to the thermoplastic resin to improve impact resistance.

Furthermore, depending on a use thereof, the thermosetting resin and the thermoplastic resin may contain other fillers and additives as appropriate within a range that does not impair the purpose of the present invention. The thermosetting resin and the thermoplastic resin may include, for example, inorganic fillers, flame retardants, conductivity-imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, colorants, pigments, dyes, foaming agents, foam control agents, and coupling agents.

The fiber-reinforced plastic according to the present invention is not particularly limited in a use thereof, and is preferably used for aircraft structural members, windmill blades, automobile outer panels, computer applications such as IC trays and laptop computer cases, and even sports applications such as golf shafts and tennis rackets.

[Method for Manufacturing Fiber-reinforced Plastic]

The method for manufacturing the fiber-reinforced plastic according to the present invention includes:
- a step 1 of impregnating the thermosetting resin with the reinforcing fiber bundle;
- a step 2 of impregnating the thermoplastic resin with the reinforcing fiber bundle;
- a step 3 of cutting the reinforcing fiber bundle to form the discontinuous reinforcing fiber bundles;
- a step 4 of laminating a required number of base materials constituting the fiber-reinforced plastic so that the thermoplastic resin is exposed on at least one surface in a thickness direction; and
- a step 5 of molding the fiber-reinforced plastic by heating and pressing, in which
- the step 5 is performed after the steps 1 to 4 are performed, or is performed simultaneously with the step 2 after the steps 1, 3 and 4 are performed, or is performed simultaneously with the step 1 after the steps 2, 3 and 4 are performed.

In the method for manufacturing the fiber-reinforced plastic according to the present invention, viscosity of the thermosetting resin and the thermoplastic resin is lowered by heating. When applying pressure in this state, the discontinuous reinforcing fiber bundles flow together with the thermosetting resin and the thermoplastic resin due to, for example, shaping and/or stretching, and it is possible to mold a fiber-reinforced plastic in which the thermosetting resin and the thermoplastic resin are sufficiently impregnated with the discontinuous reinforcing fiber bundles while following a complicated shape.

In the case where the step 5 is performed after the steps 1 to 4 are performed, the steps 1 to 4 may be performed in any order, and the performing procedure is not limited. As long as the thermoplastic resin is exposed on at least one surface layer in the thickness direction, for example, impregnation of the thermosetting resin and the thermoplastic resin, cutting of the reinforcing fiber bundles, and the like may be implemented after laminating the base materials constituting the fiber-reinforced plastic. Then, the fiber-reinforced plastic of the present invention is molded by the step 5.

In the case where the step 5 is performed simultaneously with the step 2, the two steps can be performed at the same time, so that the fiber-reinforced plastic according to the present invention can be manufactured efficiently. In this case, the steps 1, 3, and 4 may be performed in any order, and as long as the thermoplastic resin is exposed on at least one surface layer in the thickness direction, the performing procedure is not limited. Then, by performing the step 5 and the step 2 at the same time, the fiber-reinforced plastic according to the present invention is molded while impregnating the thermoplastic resin in the discontinuous reinforcing fiber bundles.

Similarly, in the case where the step 5 is performed simultaneously with the step 1, the two steps can be performed at the same time, so that the fiber-reinforced plastic according to the present invention can be manufactured efficiently. In this case, the steps 2, 3, and 4 may be performed in any order, and as long as the thermoplastic resin is exposed on at least one surface layer in the thickness direction, the performing procedure is not limited. Then, by performing the step 5 and the step 1 at the same time, the fiber-reinforced plastic according to the present invention is molded while impregnating the thermosetting resin in the discontinuous reinforcing fiber bundles.

In the step 1, a method for impregnating the thermosetting resin with the reinforcing fiber bundles is not particularly limited, and examples thereof include a method of impregnating the thermosetting resin with the discontinuous reinforcing fiber bundles obtained by cutting the reinforcing fiber bundles into a predetermined shape, a method of impregnating the thermosetting resin with an intermediate containing the thermoplastic resin and the discontinuous reinforcing fiber bundles, a method of cutting a unidirectional prepreg impregnated with the thermoplastic resin into a certain width and fiber length with a roll cutter or the like, dispersing the prepreg into a sheet, and impregnating the thermosetting resin from one or both sides of the prepreg, and a method of impregnating the thermosetting resin from one side or both sides of the unidirectional prepreg after inserting a slit by using a rotary blade, the Thomson blade, an automatic cutting machine, laser irradiation, or the like into a specific portion of the unidirectional prepreg.

In the step 2, a method for impregnating the thermoplastic resin with the reinforcing fiber bundles is not particularly limited, and examples thereof include a method of impregnating the thermoplastic resin with the discontinuous reinforcing fiber bundles obtained by cutting the reinforcing fiber bundles into a predetermined shape, a method of impregnating the thermoplastic resin with an intermediate containing the thermosetting resin and the discontinuous reinforcing fiber bundles, a method of cutting a unidirectional prepreg impregnated with the thermosetting resin into a certain width and fiber length with a roll cutter or the like, dispersing the prepreg into a sheet, and impregnating the thermoplastic resin from one or both sides of the prepreg, and a method of impregnating the thermoplastic resin from one side or both sides of the unidirectional prepreg after inserting a slit by using a rotary blade, the Thomson blade, an automatic cutting machine, laser irradiation, or the like into a specific portion of the unidirectional prepreg.

In the step 3, a method for cutting the reinforcing fiber bundles to form the discontinuous reinforcing fiber bundles is not particularly limited, and examples thereof include a method of cutting a unidirectional prepreg impregnated with the thermosetting resin and/or the thermoplastic resin into a certain width and fiber length with a roll cutter or the like, and a method of inserting a slit by using a rotary blade, the Thomson blade, an automatic cutting machine, laser irradiation, or the like into a specific portion of the unidirectional prepreg.

In the step 4, a method for laminating a required number of base materials constituting the fiber-reinforced plastic so that the thermoplastic resin is exposed on at least one surface in the thickness direction is not particularly limited, and examples thereof include a manual lamination method and a lamination method using a robot arm or the like.

In the step 5, the heating temperature and the applied pressure vary depending on the types of the thermosetting resin and the thermoplastic resin used in the fiber-reinforced plastic according to the present invention. The heating temperature and the applied pressure may be in a temperature range and a pressure range at which both the thermosetting resin and the thermoplastic resin flow, and if necessary, may be in a temperature range and a pressure range at which the discontinuous reinforcing fiber bundles flow together with both the resins.

Examples of the heating and pressing method include a heating and pressing method using a heat roll, a press molding method, an autoclave molding method, a vacuum pressure molding method, and an internal pressure molding method.

It is preferable that the method for manufacturing the fiber-reinforced plastic according to the present invention further includes a step 6 of flowing the base material so that the end portions of the discontinuous reinforcing fiber bundles in the longitudinal direction are in contact with the thermosetting resin or the thermoplastic resin in the surface layer where the thermoplastic resin is exposed.

It is preferable that the end portions in the longitudinal direction of the discontinuous reinforcing fiber bundles are in contact with the thermosetting resin or the thermoplastic resin since stress concentration at the end portions in the longitudinal direction of the discontinuous reinforcing fiber bundles can be prevented, and the characteristics of the fiber-reinforced plastic of the present invention can be further exhibited.

Preferably, the step 6 is performed before the step 5 or at the same time as the step 5.

In the step 6, in the surface layer where the thermoplastic resin is exposed, it is preferable that at least a part of the discontinuous reinforcing fiber bundles is in contact with both the thermosetting resin and the thermoplastic resin, and the base materials are flowed so that at least one of the reinforcing fibers constituting the reinforcing fiber bundles and the thermoplastic resin are continuously in contact with each other in the longitudinal direction from the end portions of the reinforcing fibers in the longitudinal direction.

It is preferable that the thermoplastic resin is in continuous contact with the end portions in the longitudinal direction of the reinforcing fibers in the longitudinal direction since the shape of the interface between the thermosetting resin and the thermoplastic resin passing through the reinforcing fibers becomes more complicated, the joining between the thermosetting resin and the thermoplastic resin becomes stronger, and the characteristics of the fiber-reinforced plastic according to the present invention can be further exhibited.

Furthermore, in the step 6, it is preferable that the base material is flowed so that there is a combination in which only the thermoplastic resin exists on a straight line connecting an end portion in the longitudinal direction of the discontinuous reinforcing fiber bundle and another discontinuous reinforcing fiber bundle.

In the case where there is the combination in which only the thermoplastic resin exists on a straight line connecting an end portion in the longitudinal direction of the discontinuous reinforcing fiber bundle and another discontinuous reinforcing fiber bundle, it becomes easy to provide a structure in which the thermoplastic resin is deeply impregnated between the fiber bundles. It is preferable since the interface between the thermosetting resin and the thermoplastic resin can have a more complicated structure, the joining between the thermosetting resin and the thermoplastic resin becomes stronger, and the characteristics of the fiber-reinforced plastic according to the present invention can be further exhibited.

The fiber-reinforced plastic according to the present invention can be manufactured by laminating a base material constituting the fiber-reinforced plastic alone or together with another prepreg, a sheet molding compound, a prepreg with slits, and the like by a known method, and then curing the obtained laminate by heating and pressing.

In this case, an order of lamination of other layers is not limited as long as the thermoplastic resin is exposed on at least one surface layer in the thickness direction of the manufactured fiber-reinforced plastic.

The fiber-reinforced plastic according to the present invention may be manufactured by stretching the base material constituting the fiber-reinforced plastic by press molding. The fiber-reinforced plastic according to the present invention contains the discontinuous reinforcing fiber bundles. Therefore, in the case where press molding is used, as the thermosetting resin and thermoplastic resin contained in the fiber-reinforced plastic flow, the discontinuous reinforcing fiber bundles also flow, and the fiber-reinforced plastic according to the present invention has excellent shape followability. Examples of the structure with excellent shape followability include, but are not limited to, structures in which the discontinuous reinforcing fiber bundles are oriented in the out-of-plane direction, such as rib shapes and concave-convex shapes.

In this case, the shape formed by stretch molding is not particularly limited as long as the base material can sufficiently follow the shape and maintain sufficient surface quality and joining strength, but it is preferable to mold such that a surface area of the surface layer is 100% or more and 200% or less with respect to 100% of the surface area of the base material constituting the fiber-reinforced plastic, since characteristics of excellent shape followability possessed by the fiber-reinforced plastic according to the present invention can be exhibited. A range of the surface area of the molded product to the surface area of the base material is preferably 100% or more and 180% or less, and more preferably 100% or more and 150% or less.

EXAMPLES

Hereinafter, the present invention will be described in detail with reference to Examples. However, the scope of the present invention is not limited to these Examples. Note that unless otherwise noted, measurements of various properties were performed under an environment of a temperature of 23° C. and a relative humidity of 50%.

Material

The materials shown below were used.
Reinforcing Fiber [A]
Carbon fibers [Torayca® T700S-24K, manufactured by Toray Industries, Inc., strand tensile strength: 4.9 GPa] were used.
Thermosetting Resin [B]
Epoxy resin main agents, that is 30 parts by mass, 40 parts by mass, and 30 parts by mass of ("jER®" 828 (manufactured by Mitsubishi Chemical Corporation)), ("jER®" 1001 (manufactured by Mitsubishi Chemical Corporation)), and ("jER®" 154 (manufactured by Mitsubishi Chemical Corporation)) were added, respectively, and kneaded under heating at 150° C. until the components were mutually dissolved. Next, while continuing kneading, the temperature was lowered to 80° C., 26 parts by mass of a curing agent (3,3'DAS (3,3'-diaminodiphenylsulfone, manufactured by Mitsubishi Fine Chemicals, Inc)) was added, and the mixture was kneaded at 80° C. for 30 minutes to obtain a thermosetting resin [B].

Thermosetting Resin [C]

A sheet of polyamide 6 ("Amilan®" CM4000 (manufactured by Toray Industries, Inc.), terpolymerized polyamide resin, melting point 155° C.) was used.

Evaluation Method

Maximum Impregnation Distance and Average Roughness Height

After embedding and polishing cross-section of the fiber-reinforced plastic produced in each Example and Comparative Example, a 500 μm square range near the joining surface was observed by using an optical microscope. The carbon fibers, the thermoplastic resin, and the thermosetting resin were distinguished from the difference in contrast of the obtained images.

Next, in a region where the thermoplastic resin was continuous from the joining surface in the thickness direction, a point first in contact with the reinforcing fibers was extracted, and a line drawn parallel to the joining surface starting from that point was used as a reference line. Vertical baselines were drawn at an interval of 5 μm from the reference line through the thermoplastic resin toward the thermosetting resin, and all points where the vertical baselines intersected the thermosetting resin, the reinforcing fibers, or the voids for the first time were plotted. A maximum distance from the plotted points to the reference line was defined as the maximum impregnation distance.

A surface forming an angle of 45 degrees with respect to an arbitrary direction in Examples 1-1 to 1-4 and Comparative Examples 1-1 and 1-2 described later, and with respect to an orientation direction of the reinforcing fibers on joining surfaces in Examples 2-1 and 2-2 and Comparative Example 2-1 was cut out, and after embedding and polishing the cross section, a 500 μm square range near the joining surface was observed by using an optical microscope. Then, a reference line and vertical baselines were created in the same manner as in the maximum impregnation distance measurement, measurement points where the vertical baselines intersected the thermosetting resin for the first time were plotted, a line obtained by connecting the plotted points was used as a cross-sectional curve, and filtering was performed to calculate the average roughness height.

Longitudinal Impregnation Distance

Discontinuous reinforcing fiber bundles located near the surface layer were randomly selected, and the fiber-reinforced plastic was cut out parallel to the thickness direction so as to be parallel to the orientation direction of the reinforcing fibers constituting the discontinuous reinforcing fiber bundles. A plurality of locations were extracted where the thermoplastic resin continuous from the joining surface in the thickness direction was in contact with the end portions in the longitudinal direction of the reinforcing fibers constituting the discontinuous reinforcing fiber bundles. For the reinforcing fiber that is in contact with both the thermosetting resin and the thermoplastic resin among the discontinuous reinforcing fiber bundles, from the end portion in the longitudinal direction of the reinforcing fiber that is in contact with the thermoplastic resin, a reference line was drawn along the longitudinal direction of the reinforcing fiber. The points where the reference lines intersected the thermosetting resin or the voids for the first time were extracted, and an average value thereof was taken as the longitudinal impregnation distance.

Measurement of Length Passing Through Thermoplastic Resin between Discontinuous Reinforcing Fiber Bundles In the image used for measuring the longitudinal impregnation distance, a straight line was drawn from the end portion in the longitudinal direction of the discontinuous reinforcing fiber bundle toward an end portion or a side of another discontinuous reinforcing fiber bundle, which was the shortest distance, so as not to pass through the reinforcing fibers, and a total length passing through the thermoplastic resin was measured. Among the straight lines whose total length that passed through the thermoplastic resin was 30% or more among the straight lines, a ratio of the straight lines whose total length that passed through the thermoplastic resin was 50% or more was evaluated based on the following criteria.

A: 80% or more
B: 50% or more and less than 80%
C: 30% or more and less than 50%
D: Less than 30% or no straight line with a total length that passed through the thermoplastic resin of 30% or more Volume Content of Reinforcing Fiber In Examples 1-1 to 1-4 and Comparative Examples 1-1 and 1-2, the fiber-reinforced plastic was cut in an arbitrary direction, embedded and polished, and then cross-sectional images of the discontinuous reinforcing fiber bundles in the surface layer were obtained by using an optical microscope. A discontinuous reinforcing fiber bundle oriented substantially perpendicularly to an observation plane was selected from the cross-sectional images, and the fiber volume content of the discontinuous reinforcing fiber bundle was calculated from the area ratio. The fiber volume content was calculated for a plurality of discontinuous reinforcing fiber bundles, and the average value thereof was taken as the volume content of the reinforcing fibers in the surface layer.

In Examples 2-1, 2-2 and Comparative Example 2-1, the fiber-reinforced plastic was cut in a direction perpendicular to the orientation direction of the reinforcing fibers in the surface layer, embedded and polished, and then cross-sectional images of the discontinuous reinforcing fiber bundles in the surface layer were obtained by using an optical microscope. Subsequently, the fiber volume content of the discontinuous reinforcing fibers in the cross-sectional image was calculated from the area ratio. The fiber volume content was calculated for a plurality of locations, and the average value thereof was taken as the volume content of the reinforcing fibers in the surface layer.

Tensile Shear Joining Strength

Two pieces of the fiber-reinforced plastics manufactured in each of the Examples and Comparative Examples were cut into a shape of 250 mm in width and 92.5 mm in length, and dried in a vacuum oven for 24 hours. Then, two pieces of the fiber-reinforced plastic were overlapped so that the surfaces containing the thermoplastic resin [C] faced to each other. An overlapping area was a width of 250 mm and a length of 12.5 mm.

Then, the laminate was applied with a pressure of 3 MPa under a temperature 20° C. higher than the melting point of the thermoplastic resin [C] and held for 1 minute to weld the overlapping surfaces to obtain an integrated product. A tab was adhered to the obtained integrated product in accordance with ISO 4587:1995 (JIS K6850 (1994)) and then being cut to have a width of 25 mm to obtain a test piece.

The obtained test piece was dried in a vacuum oven for 24 hours, and the tensile shear joining strength was measured based on ISO 4587:1995 (JIS K6850 (1994)), and measurement results were evaluated based on the following criteria.
A: 30 MPa or more
B: 10 MPa or more and less than 30 MPa
C: less than 10 MPa (failed) or not joined

Example 1-1

A reinforcing fiber sheet in which the reinforcing fibers [A] were arranged in one direction (basis weight 120 g/m$^2$) was pulled out to produce a continuous reinforcing fiber bundle. The obtained continuous reinforcing fiber bundle was thinly coated with the thermosetting resin [B], continuously inserted into a rotary cutter provided with blades spaced at an interval of 25 mm in a circumferential direction to produce chopped fiber bundles (discontinuous reinforcing fiber bundles).

The thermosetting resin [B] was applied onto a release film to prepare two sheets of the thermosetting resin [B].

Then, the chopped fiber bundles were evenly dispersed on one sheet of the thermosetting resin [B], and the other sheet of the thermosetting resin [B] was placed thereon. An SMC prepreg was manufactured by pressing with a roller at 0.07 MPa while heating at 100° C. such that the thermosetting resin [B] was not hardened. A volume content of the reinforcing fibers [A] in the SMC prepreg was adjusted to 40%. In the SMC prepreg, the dispersed chopped fiber bundles were stacked.

Eight sheets of the SMC prepreg cut into a size of 300 mm square were laminated, and a sheet of the thermoplastic resin [C] was attached to a surface layer of one side to obtain a fiber-reinforced plastic uncured laminate.

The fiber-reinforced plastic uncured laminate was set in a mold having a surface area of 300 mm×300 mm, applied with a pressure of 0.6 MPa by a press machine to eliminate voids, and heated at 180° C. for 2 hours to obtain a fiber-reinforced plastic.

The obtained fiber-reinforced plastic had little unevenness in thickness. It was possible to confirm from observation of a cross section that a region containing the thermosetting resin [B] as a main component and a region containing the thermoplastic resin [C] as a main component flowed in contact with each other to form an interface, and that the thermoplastic resin [C] was impregnated between the discontinuous reinforcing fiber bundles. In all observed regions, end portions of the discontinuous reinforcing fiber bundles in the longitudinal direction were in contact with the thermosetting resin or thermoplastic resin within a visual observation range.

A part of the discontinuous reinforcing fiber bundles located on the surface layer was in contact with both the thermosetting resin and the thermoplastic resin, at least a part of the reinforcing fibers constituting the discontinuous reinforcing fiber bundles was in contact with both the thermosetting resin and the thermoplastic resin, and some of the reinforcing fibers were in continuous contact with the thermoplastic resin in the longitudinal direction from the end portions in the longitudinal direction of the reinforcing fibers. A straight line having a total length of 100% that passed through the thermoplastic resin could be drawn between a plurality of discontinuous reinforcing fiber bundles. The obtained fiber-reinforced plastic exhibited sufficient joining strength.

Example 1-2

A fiber-reinforced plastic was obtained in the same manner as in Example 1-1, except that a fiber-reinforced plastic uncured laminate was set in a mold having a surface area of 350 mm×350 mm, and was stretched by being applied with a pressure of 3 MPa by a press machine.

The obtained fiber-reinforced plastic was thinner than that of Example 1-1, but had less unevenness in thickness, and the fiber-reinforced plastic after pressing was stretched to 350 mm square without gaps, and was excellent in shape followability. Since a distance between the discontinuous reinforcing fiber bundles was wider than in Example 1-1, the impregnation of the thermoplastic resin [C] between the discontinuous reinforcing fiber bundles was clearly visible compared with Example 1-1. In all observed regions, end portions of the discontinuous reinforcing fiber bundles in the longitudinal direction were in contact with the thermosetting resin or thermoplastic resin within a visual observation range.

A part of the discontinuous fiber-reinforced fiber bundles located on the surface layer was in contact with both the thermosetting resin and the thermoplastic resin, at least a part of the reinforcing fibers constituting the discontinuous reinforcing fiber bundles was in contact with both the thermosetting resin and the thermoplastic resin, and some of the reinforcing fibers were in continuous contact with the thermoplastic resin in the longitudinal direction from the end portions in the longitudinal direction of the reinforcing fibers. A straight line having a total length of 100% that passed through the thermoplastic resin could be drawn between a plurality of discontinuous reinforcing fiber bundles. The obtained fiber-reinforced plastic exhibited sufficient joining strength.

Example 1-3

Eight pieces of the SMC prepreg cut into a 300 mm square and eight sheets of the thermoplastic resin [C] were prepared. One sheet of thermoplastic resin [C] was placed under each SMC prepreg to obtain a fiber-reinforced plastic uncured laminate in which the SMC prepregs and the sheets of the thermoplastic resin [C] were alternately laminated. The fiber-reinforced plastic uncured laminate was cured and joined by the method described in Example 1-1 to obtain a fiber-reinforced plastic in which the thermoplastic resin [C] was exposed on the surface on one side.

The obtained fiber-reinforced plastic had little unevenness in thickness. It was possible to confirm from observation of a cross section that a region containing the thermosetting resin [B] as a main component and a region containing the thermoplastic resin [C] as a main component flowed in contact with each other to form an interface, and that the thermoplastic resin [C] was impregnated between the discontinuous reinforcing fiber bundles. In all observed regions, end portions of the discontinuous reinforcing fiber bundles in the longitudinal direction were in contact with the thermosetting resin or thermoplastic resin within a visual observation range.

A part of the discontinuous reinforcing fiber bundles located on the surface layer was in contact with both the thermosetting resin and the thermoplastic resin, at least a part of the reinforcing fibers constituting the discontinuous reinforcing fiber bundles was in contact with both the thermosetting resin and the thermoplastic resin, and some of the reinforcing fibers were in continuous contact with the thermoplastic resin in the longitudinal direction from the end portions in the longitudinal direction of the reinforcing fibers. A straight line having a total length of 100% that passed through the thermoplastic resin could be drawn between a plurality of discontinuous reinforcing fiber bundles. A layer made of the thermoplastic resin was observed between the layers other than the surface layer. The obtained fiber-reinforced plastic exhibited sufficient joining strength.

Example 1-4

A fiber-reinforced plastic was obtained in the same manner as in Example 1-3, except that a fiber-reinforced plastic uncured laminate was set in a mold having a surface area of 350 mm×350 mm, and was stretched by being applied with a pressure of 3 MPa by a press machine.

The obtained fiber-reinforced plastic was thinner than that of Example 1-3, but had less unevenness in thickness, and the fiber-reinforced plastic after pressing was stretched to 350 mm square without gaps, and was excellent in shape followability. Since a distance between the discontinuous reinforcing fiber bundles was wider than in Example 1-3, the impregnation of the thermoplastic resin [C] between the discontinuous reinforcing fiber bundles was clearly visible compared with Example 1-3. In all observed regions, end portions of the discontinuous reinforcing fiber bundles in the longitudinal direction were in contact with the thermosetting resin or thermoplastic resin within a visual observation range.

A part of the discontinuous reinforcing fiber bundles located on the surface layer was in contact with both the thermosetting resin and the thermoplastic resin, at least a part of the reinforcing fibers constituting the discontinuous reinforcing fiber bundles was in contact with both the thermosetting resin and the thermoplastic resin, and some of the reinforcing fibers were in continuous contact with the thermoplastic resin in the longitudinal direction from the end portions in the longitudinal direction of the reinforcing fibers. A straight line having a total length of 100% that passed through the thermoplastic resin could be drawn between a plurality of discontinuous reinforcing fiber bundles. A layer made of the thermoplastic resin was observed between the layers other than the surface layer. The obtained fiber-reinforced plastic exhibited sufficient joining strength.

Example 2-1

A continuous reinforcing fiber sheet (basis weight 120 g/m$^2$) in which the reinforcing fibers [A] were arranged in one direction was pulled out and run in one direction. The thermosetting resin [B] was coated on a release film to produce two sheets of the thermosetting resin [B]. Then, sheets of the thermosetting resin [B] were pressed from above and below against the sheet of the reinforcing fibers [A] running in one direction with a roller at 0.07 MPa while heating at a temperature of 100° C., such that the thermosetting resin [B] was not hardened, to produce a unidirectional prepreg.

Then, slits were made by using a rotary blade at an angle of 14° with respect to the longitudinal direction of the reinforcing fibers [A] in the unidirectional prepreg, so that the fiber length of the reinforcing fibers [A] was 25 mm, to obtain a prepreg with slits in which the discontinuous reinforcing fiber bundles were arranged in one direction. The volume content of the reinforcing fibers [A] in the prepreg with slits was adjusted to 60%.

The orientation direction of the reinforcing fibers [A] in the surface layer serving the joining surface was taken as 0°, eight sheets of the prepreg with slits cut into a size of 300 mm square were laminated so as to be [0°/90°]$_{2s}$ (the symbol s indicates mirror symmetry), and then the sheet of the thermoplastic resin [C] was attached to the surface layer of the joining surface to obtain a fiber-reinforced plastic uncured laminate.

The fiber-reinforced plastic uncured laminate was set in a mold having a surface area of 300 mm×300 mm, applied with a pressure of 0.6 MPa by a press machine to eliminate voids, and heated at 180° C. for 2 hours to obtain a fiber-reinforced plastic.

The obtained fiber-reinforced plastic had less unevenness in thickness than that of Example 1-1. It was possible to confirm from observation of a cross section that a region containing the thermosetting resin [B] as a main component and a region containing the thermoplastic resin [C] as a main component flowed in contact with each other to form an interface, and that the thermoplastic resin [C] was impregnated between the discontinuous reinforcing fiber bundles. In all observed regions, end portions of the discontinuous reinforcing fiber bundles in the longitudinal direction were in contact with the thermosetting resin or thermoplastic resin within a visual observation range. At least a part of the reinforcing fibers constituting the discontinuous reinforcing fiber bundles was in contact with both the thermosetting resin and the thermoplastic resin, and some of the reinforcing fibers were in continuous contact with the thermoplastic resin in the longitudinal direction from the end portions in the longitudinal direction of the reinforcing fibers.

A straight line having a total length of 100% that passed through the thermoplastic resin could be drawn between a plurality of discontinuous reinforcing fiber bundles. A part of the discontinuous reinforcing fiber bundles located on the surface layer was in contact with both the thermosetting resin and the thermoplastic resin. The obtained fiber-reinforced plastic exhibited sufficient joining strength.

Example 2-2

A fiber-reinforced plastic was obtained in the same manner as in Example 2-1, except that a fiber-reinforced plastic uncured laminate was set in a mold having a surface area of 350 mm×350 mm, and was stretched by being applied with a pressure of 3 MPa by a press machine.

The obtained fiber-reinforced plastic was thinner than that of Example 2-1, but had less unevenness in thickness, and the fiber-reinforced plastic after pressing was stretched to 350 mm square without gaps, and was excellent in shape followability. The impregnation of the thermoplastic resin [C] between the discontinuous reinforcing fiber bundles was clearly visible. In all observed regions, end portions of the discontinuous reinforcing fiber bundles in the longitudinal direction were in contact with both the thermosetting resin and the thermoplastic resin within a visual range. At least a part of the reinforcing fibers constituting the discontinuous reinforcing fiber bundles was in contact with both the thermosetting resin and the thermoplastic resin, and some of the reinforcing fibers were in continuous contact with the thermoplastic resin in the longitudinal direction from the end portions in the longitudinal direction of the reinforcing fibers.

A straight line having a total length of 100% that passed through the thermoplastic resin could be drawn between a plurality of discontinuous reinforcing fiber bundles. A part of the discontinuous reinforcing fiber bundles located on the surface layer was in contact with both the thermosetting resin and the thermoplastic resin. The obtained fiber-reinforced plastic exhibited sufficient joining strength.

Comparative Example 1-1

A fiber-reinforced plastic was obtained in the same manner as in Example 1-1, except that the sheet of the thermoplastic resin [C] was not used.

Since the obtained fiber-reinforced plastic was already in a cured state, the laminate was not joined during pressing when preparing a test piece for tensile shear joining strength measurement, and evaluation thereof was not possible.

Comparative Example 1-2

Eight sheets of the SMC prepregs were laminated in the same manner as in Example 1-1 to prepare a fiber-reinforced plastic uncured laminate without using the sheet of the thermoplastic resin [C].

The fiber-reinforced plastic uncured laminate was set in a mold having a surface area of 300 mm×300 mm, applied with a pressure of 0.6 MPa by a press machine to eliminate voids, and heated at 180° C. for 2 hours to obtain a cured product. Then, the sheet of the thermoplastic resin [C] was superimposed on one side surface of the cured product and then melted under 180° C. for 2 hours, and the thermoplastic resin [C] was adhered to the cured product to obtain the fiber-reinforced plastic.

The obtained fiber-reinforced plastic had little unevenness in thickness, but almost no impregnation of the thermoplastic resin [C] into the discontinuous fiber bundles was observed, and the joining strength was not sufficient.

Comparative Example 2-1

The prepregs with slits were laminated in the same manner as in Example 2-2 except that the sheet of the thermoplastic resin [C] was not used, and the fiber-reinforced plastic uncured laminate was set in a mold having a surface area of 350 mm×350 mm, and was stretched by being applied with a pressure of 3 MPa by a press machine to produce a cured product not containing the thermoplastic resin [C]. Then, the sheet of the thermoplastic resin [C] cut into a size of 350 mm×350 mm was superimposed on one side surface of the cured product, set in a mold having a surface area of 350 mm×350 mm, applied with a pressure of 3 MPa by a press machine to eliminate voids, and then melted under 180° C. for 2 hours, and the thermoplastic resin [C] was adhered to the cured product to obtain the fiber-reinforced plastic.

The cured product after pressing was stretched to 350 mm square without gaps, and was excellent in shape followability. The obtained fiber-reinforced plastic had little unevenness in thickness. However, almost no impregnation of the thermoplastic resin [C] between the discontinuous fiber bundles and into the discontinuous fiber bundles was observed, and the joining strength was not sufficient.

Evaluation of Shape Followability

Example 3-1

The orientation direction of the reinforcing fibers [A] in the surface layer serving the joining surface was taken as 0°, four sheets of the prepreg with slits produced in Example 2-1 were laminated so as to be [0°/90°]$_s$ in a size of 200 mm square, and then the sheet of the thermoplastic resin [C] was attached to the surface layer on one side to obtain a fiber-reinforced plastic uncured laminate.

The fiber-reinforced plastic uncured laminate was set in a mold having a flat surface and a curved surface so that the thermoplastic resin [C] faces upward, applied with a pressure of 3 MPa by a press machine to eliminate voids, and heated at 180° C. for 2 hours to obtain a fiber-reinforced plastic having a shape illustrated in FIG. 9.

When the surface layer of the joining surface of the fiber-reinforced plastic after pressing was visually observed, no wrinkles had occurred in the curved surface portion. There were fewer resin-rich portions at corners of the curved surface than in Comparative Example 3-1, which will be described below.

Comparative Example 3-1

A fiber-reinforced plastic was obtained in the same manner as in Example 3-1, except that no slits were inserted.

When the surface layer of the joining surface of the obtained fiber-reinforced plastic was visually observed, almost no wrinkles had occurred in the curved surface portion, but the resin-rich portions were formed in a part of a corner region of the curved surface compared with Example 3-1, and the shape followability and homogeneity were inferior.

Overview of the fiber-reinforced plastics produced in Examples 1-1 to 1-4, 2-1, 2-2 and Comparative Examples 1-1, 1-2, 2-1, and evaluation results of the maximum impregnation distance, average roughness height, volume content of the reinforcing fibers in the surface layer, and tensile shear joining strength are shown in Table 1.

Note that the maximum impregnation distance, average roughness height, and longitudinal impregnation distance in the Examples are values rounded off to the nearest 10, and the maximum impregnation distance and average roughness height shown in the Comparative Examples are reference values obtained by using the surface of the cured product as a reference line since the thermoplastic resin did not reach the reinforcing fibers.

TABLE 1

|  | Prepreg | Molding size (mm × mm) | Maximum impregnation distance (μm) | Average roughness height (μm) |
| --- | --- | --- | --- | --- |
| Example 1-1 | SMC prepreg | 300 × 300 | 90 | 60 |
| Example 1-2 | SMC prepreg | 350 × 350 | 120 | 70 |
| Example 1-3 | SMC prepreg | 300 × 300 | 90 | 50 |
| Example 1-4 | SMC prepreg | 350 × 350 | 110 | 70 |
| Example 2-1 | Prepreg with slits | 300 × 300 | 80 | 50 |
| Example 2-2 | Prepreg with slits | 350 × 350 | 120 | 60 |
| Comparative Example 1-1 | SMC prepreg | 300 × 300 | — | — |

TABLE 1-continued

| | | | | |
|---|---|---|---|---|
| Comparative Example 1-2 | SMC prepreg | 300 × 300 | 7* | 4* |
| Comparative Example 2-1 | Prepreg with slits | 350 × 350 | 5* | 3* |

| | Volume content of reinforcing fibers in surface layer Vf (%) | Longitudinal impregnation distance (μm) | Tensile shear joining strength | Ratio of straight lines in which thermoplastic resin occupies 50% or more |
|---|---|---|---|---|
| Example 1-1 | 36 | 60 | B | B |
| Example 1-2 | 37 | 120 | B | A |
| Example 1-3 | 32 | 110 | B | A |
| Example 1-4 | 35 | 240 | B | A |
| Example 2-1 | 43 | 130 | A | A |
| Example 2-2 | 44 | 240 | A | A |
| Comparative Example 1-1 | — | — | C | D |
| Comparative Example 1-2 | — | — | C | D |
| Comparative Example 2-1 | — | — | C | D |

*Reference values obtained by using surface of cured product as reference line

Although the present invention has been described in detail with reference to specific embodiments, it will be apparent to those skilled in the art that various modifications and variations are possible without departing from the spirit and scope of the present invention. The present application is based on a Japanese Patent Application (Japanese Patent Application No. 2020-126652) filed on Jul. 27, 2020, contents of which are incorporated herein by reference.

REFERENCE SIGNS LIST

1: fiber-reinforced plastic
2: discontinuous reinforcing fiber bundle
3: discontinuous reinforcing fiber
4, 4': thermoplastic resin
5: thermosetting resin
6: interface
7: prepreg with slits
8: slits
9: longitudinal direction of reinforcing fiber bundle
10: direction perpendicular to longitudinal direction of reinforcing fiber bundle
11: reference line
12: vertical baseline
13: measurement point for impregnation distance
14: measurement point for average roughness height
15: reference line drawn along side surface of reinforcing fiber
16: measurement point for longitudinal impregnation distance

The invention claimed is:

1. A fiber-reinforced plastic, comprising a layer comprising reinforcing fibers and a matrix in which a thermosetting resin and a thermoplastic resin are integrated, as at least one surface layer in a thickness direction, wherein
the reinforcing fibers form discontinuous reinforcing fiber bundles stacked randomly or form discontinuous reinforcing fiber bundles arranged in one direction,
a part of the discontinuous reinforcing fiber bundles is in contact with both the thermosetting resin and the thermoplastic resin, and
the thermoplastic resin is exposed on at least a part of a surface of the surface layer,
wherein the surface layer has a content of the reinforcing fibers of 15 volume % or more and 70 volume % or less.

2. The fiber-reinforced plastic according to claim 1, wherein
in the surface layer, a region containing the thermosetting resin as a main component and a region containing the thermoplastic resin as a main component form an interface.

3. The fiber-reinforced plastic according to claim 1, wherein
in the surface layer, the thermoplastic resin comprises a continuous region in the thickness direction from the surface, and
a maximum thickness of a portion where the thermoplastic resin is in contact with the discontinuous reinforcing fiber bundles in the continuous region is 10 μm or more.

4. The fiber-reinforced plastic according to claim 1, wherein
in the surface layer, the reinforcing fibers have an average fiber length in a range of 5 mm to 100 mm.

5. The fiber-reinforced plastic according to claim 1, wherein
in the surface layer, the reinforcing fibers are at least one kind selected from the group consisting of carbon fibers and glass fibers.

6. A fiber-reinforced plastic, comprising a layer comprising reinforcing fibers and a matrix in which a thermosetting resin and a thermoplastic resin are integrated, as at least one surface layer in a thickness direction, wherein
the reinforcing fibers form discontinuous reinforcing fiber bundles stacked randomly or form discontinuous reinforcing fiber bundles arranged in one direction,
a part of the discontinuous reinforcing fiber bundles is in contact with both the thermosetting resin and the thermoplastic resin, and
the surface layer has a presence ratio of voids in contact with end portions in a longitudinal direction of the discontinuous reinforcing fiber bundles being 5 area % or less.

7. The fiber-reinforced plastic according to claim 1, wherein
the surface layer has a longitudinal impregnation distance of 20 μm or more.

8. The fiber-reinforced plastic according to claim 1, wherein
in the surface layer, the thermoplastic resin is present between the discontinuous reinforcing fiber bundles.

9. The fiber-reinforced plastic according to claim 8, wherein
the thermoplastic resin occupies between adjacent discontinuous reinforcing fiber bundles arbitrarily selected.

10. The fiber-reinforced plastic according to claim 1, wherein
both surface layers in the thickness direction comprise the discontinuous reinforcing fiber bundles, the thermoplastic resin, and the thermosetting resin, and
the thermoplastic resin is exposed on surfaces of both the surface layers.

11. The fiber-reinforced plastic according to claim 1, wherein
at least a part of the discontinuous reinforcing fiber bundles constituting the fiber-reinforced plastic is arranged in an out-of-plane direction.

12. A method for manufacturing the fiber-reinforced plastic described in claim 1, comprising:
a step 1 of impregnating the thermosetting resin with a reinforcing fiber bundle;
a step 2 of impregnating the thermoplastic resin with the reinforcing fiber bundle;
a step 3 of cutting the reinforcing fiber bundle to form discontinuous reinforcing fiber bundles;
a step 4 of laminating a required number of base materials constituting the fiber-reinforced plastic so that the thermoplastic resin is exposed on at least one surface in a thickness direction; and
a step 5 of molding the fiber-reinforced plastic by heating and pressing, wherein
the step 5 is performed after the steps 1 to 4 are performed, or is performed simultaneously with the step 2 after the steps 1, 3 and 4 are performed, or is performed simultaneously with the step 1 after the steps 2, 3 and 4 are performed.

13. The method for manufacturing the fiber-reinforced plastic according to claim 12, further comprising:
a step 6 of flowing so that end portions of the discontinuous reinforcing fiber bundles in a longitudinal direction are in contact with the thermosetting resin or the thermoplastic resin in the surface layer where the thermoplastic resin is exposed.

14. The method for manufacturing the fiber-reinforced plastic according to claim 12, wherein in the step 6,
in the surface layer where the thermoplastic resin is exposed, at least a part of the discontinuous reinforcing fiber bundles is in contact with both the thermosetting resin and the thermoplastic resin, and
the flowing is performed so that at least one of the reinforcing fibers constituting the reinforcing fiber bundles and the thermoplastic resin are continuously in contact with each other in the longitudinal direction from an end portion of the reinforcing fiber in the longitudinal direction.

* * * * *